United States Patent
Aoki

(10) Patent No.: US 10,908,706 B2
(45) Date of Patent: Feb. 2, 2021

(54) RECHARGEABLE ELECTRONIC PEN

(71) Applicant: Wacom Co., Ltd., Saitama (JP)

(72) Inventor: Shinya Aoki, Saitama (JP)

(73) Assignee: Wacom Co., Ltd., Saitama (JP)

(*) Notice: Subject to any disclaimer, the term of this patent is extended or adjusted under 35 U.S.C. 154(b) by 0 days.

(21) Appl. No.: 16/590,184

(22) Filed: Oct. 1, 2019

(65) Prior Publication Data

US 2020/0033964 A1 Jan. 30, 2020

Related U.S. Application Data

(63) Continuation of application No. PCT/JP2018/005378, filed on Feb. 16, 2018.

(30) Foreign Application Priority Data

Apr. 27, 2017 (JP) ................. 2017-088630

(51) Int. Cl.
*G06F 3/00* (2006.01)
*G06F 3/0354* (2013.01)
(Continued)

(52) U.S. Cl.
CPC ........ *G06F 3/03545* (2013.01); *G06F 3/0383* (2013.01); *G06F 3/044* (2013.01);
(Continued)

(58) Field of Classification Search
CPC . G06F 2203/04101; G06F 2203/04108; G06F 2203/04114; G06F 3/0317–0321;
(Continued)

(56) References Cited

U.S. PATENT DOCUMENTS

2009/0024771 A1* 1/2009 Koike ............... G06F 13/4081
710/18
2009/0209306 A1* 8/2009 Griffin ............... H04M 1/236
455/575.4

(Continued)

FOREIGN PATENT DOCUMENTS

| JP | 7-182088 A | 7/1995 |
|---|---|---|
| JP | 2007-37361 A | 2/2007 |
| JP | 2012-230561 A | 11/2012 |

OTHER PUBLICATIONS

International Search Report, dated Mar. 27, 2018, for International Application No. PCT/JP2018/005378, 2 pages.

*Primary Examiner* — Sanghyuk Park
(74) *Attorney, Agent, or Firm* — Seed IP Law Group LLP

(57) ABSTRACT

A rechargeable electronic pen includes: a casing; a storage element disposed within the casing; a charging connection terminal disposed within the casing so as to expose a charging contact to an outside of the electronic pen via an opening of the casing; a switch disposed between the storage element and the charging connection terminal; and a control member configured to perform opening and closing of the switch by being displaced with respect to the casing. The control member is displaceable with respect to the casing between first and second states. When the control member is in the first state, the switch electrically connects the storage element and charging contact; when the control member is in the second state, the switch electrically disconnects the storage element and charging contact.

20 Claims, 11 Drawing Sheets

(51) Int. Cl.
    *G06F 3/038*    (2013.01)
    *G06F 3/041*    (2006.01)
    *G06F 3/044*    (2006.01)
    *G06F 3/046*    (2006.01)
    *H01R 13/52*    (2006.01)

(52) U.S. Cl.
    CPC ............ *G06F 3/046* (2013.01); *G06F 3/0412* (2013.01); *H01R 13/52* (2013.01)

(58) Field of Classification Search
    CPC ......... G06F 3/033–0386; G06F 3/0625; G06F 16/1737; G06F 1/1633–1654; G06F 1/1683; G06F 1/263; G06F 1/266; G06F 1/32; G06F 1/3296
    See application file for complete search history.

(56) References Cited

U.S. PATENT DOCUMENTS

| | | |
|---|---|---|
| 2014/0015812 A1 | 1/2014 | Peralta et al. |
| 2015/0138166 A1* | 5/2015 | Lee .......................... G06F 3/041 345/179 |
| 2016/0320868 A1 | 11/2016 | Chang |

* cited by examiner

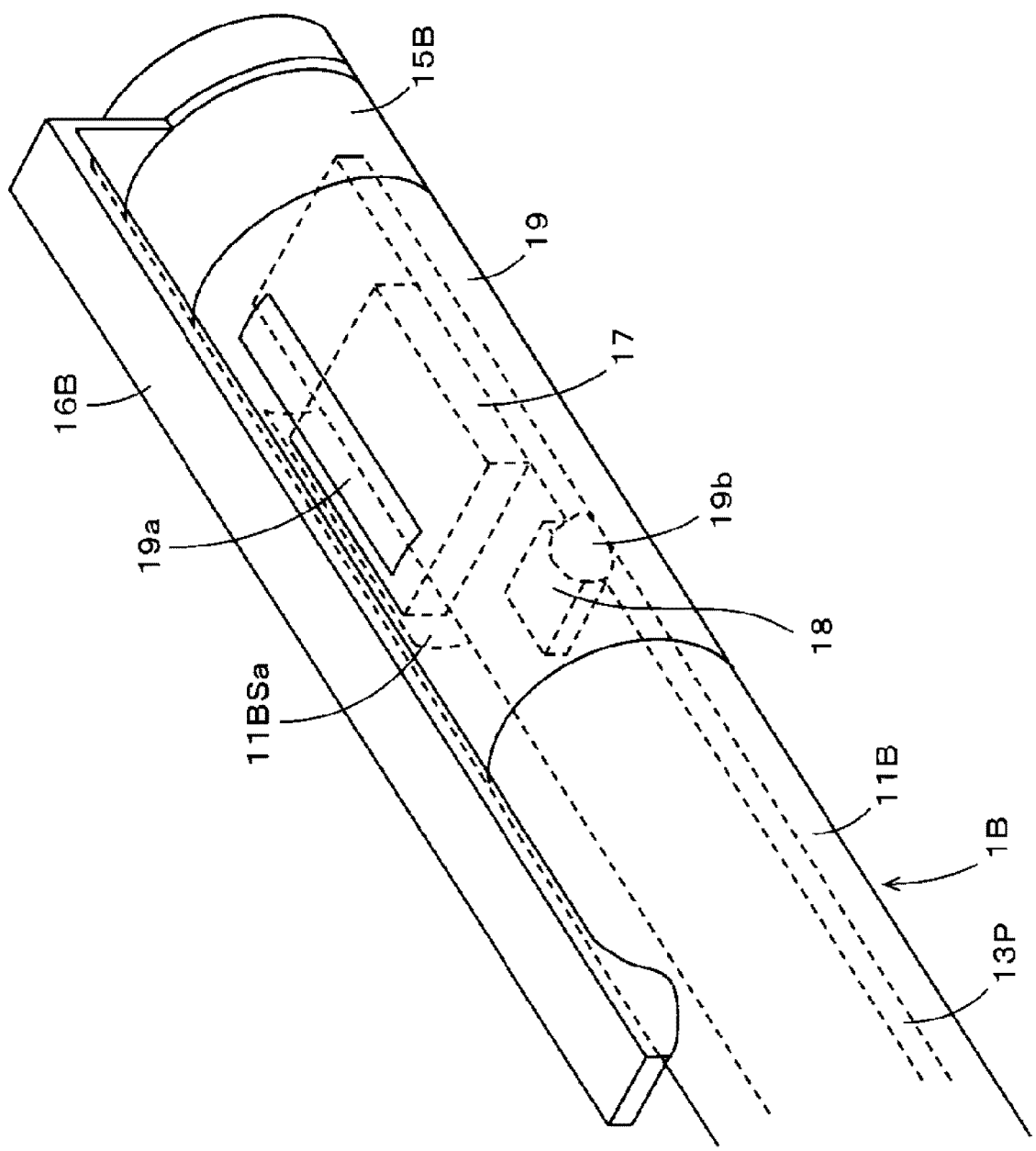

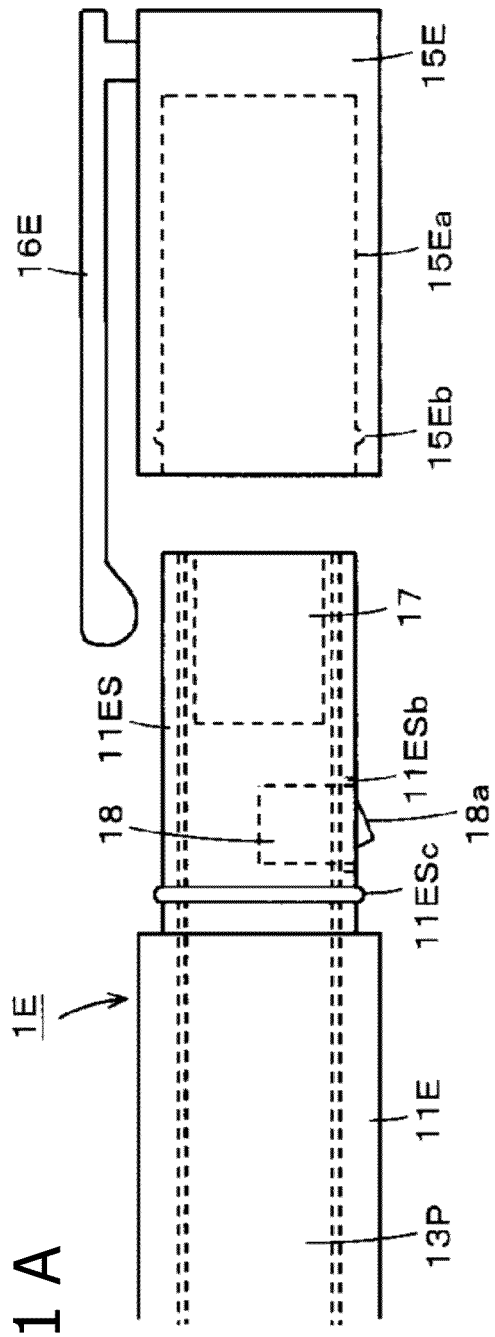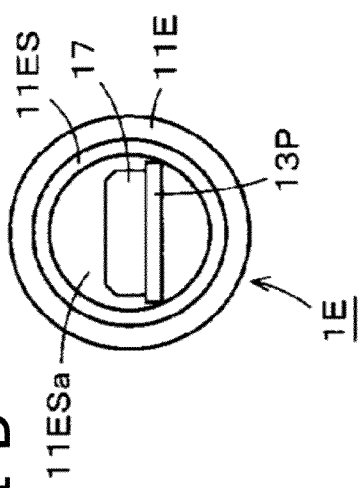

RECHARGEABLE ELECTRONIC PEN

BACKGROUND

Technical Field

The present disclosure relates to a rechargeable electronic pen.

Background Art

There has recently been an increasing usage of electronic pens as input devices in portable terminals. When signals are sent and received between an electronic pen and a sensor of a portable terminal, the portable terminal can detect a position indicated by a pen tip of the electronic pen. There are various systems for sending and receiving signals between the electronic pen and the sensor of the portable terminal, and an electromagnetic induction system and a capacitive system, in particular, are often used.

A system referred to as an active capacitive system in the capacitive system has recently been used. An electronic pen of this active capacitive system is internally provided with a power supply and a signal transmitting circuit. The signal transmitting circuit is driven by the power supply, and sends out a signal to a sensor. In addition, some electronic pens of an electromagnetic induction system also transmit identification information of the respective electronic pens and pen pressure information to a portable terminal by wireless communication using the Bluetooth (registered trademark) standard. The electronic pens of the electromagnetic induction system need a power supply.

The power supplies of electronic pens of this kind use a dry battery or use a storage element such as a rechargeable battery or a high-capacity capacitor (for example, an electric double layer capacitor or the like). Recently, a rechargeable electronic pen using a rechargeable storage element has been used in consideration of convenience.

There are various systems for charging the storage element, the various systems including charging by the electromagnetic induction system (non-contact charging), direct charging through terminal contact (contact charging), direct charging using a dedicated connector (using a charging adapter), charging using a general-purpose universal serial bus (USB) connector, and the like. Systems other than the electromagnetic induction system require only provision of a charging connection terminal member such as a connector jack or the like, and are therefore used relatively easily.

The charging connection terminal member includes a charging contact portion. A jack of a cable for connection to a charger needs to be inserted and electrically connected to the charging contact portion. Thus, the charging contact portion needs to be exposed to the outside from an opening portion of a casing of the electronic pen. However, when the charging contact portion of the charging connection terminal member is exposed from the opening portion, foreign matter such as dust or the like enters, and it may therefore be difficult to insert the jack of the cable for connection to the charger. In addition, when a drop of water adheres to the charging contact portion of the charging connection terminal member, or when the electronic pen is dropped into water, an electric short circuit may occur between the positive side terminal and negative side terminal of the charging connection terminal member, and there is a fear of the occurrence of a problem such as destruction of an internal circuit or the like.

Accordingly, a measure is taken by attaching a lid to the opening portion of the charging connection terminals, and removing the lid when using the charging connection terminals. However, the attachment and removal of the lid are troublesome, and the lid may be a hindrance when the electronic pen is used. Further, in a case where the lid is a body separate from the electronic pen, consideration needs to be given so as not to lose the lid.

Accordingly, US 2016/0320868A1 (hereinafter, referred to as Patent Document 1), for example, provides an electronic pen in which an opening portion of a charging connection terminal is provided in a side surface along the axial direction of a casing of the electronic pen, and the opening portion is covered by a ring member adjacent to a clip member for retaining the electronic pen in a breast pocket or the like, the clip member being disposed on an opposite side from a pen tip side.

However, even when the opening portion of the charging connection terminals is covered by the ring member as in the case of Patent Document 1 described above, there is a clearance between the ring member and the charging connection terminal member, and therefore a problem of the occurrence of an electric short circuit in the charging connection terminal member due to the entry of a drop of water or the like is inevitable. In addition, in the past, the charging contact portion of the charging connection terminal member has been usually electrically connected to the storage element at all times, so that natural discharge of the storage element may occur.

BRIEF SUMMARY

It is an object of the present disclosure to provide a rechargeable electronic pen that can solve the above problems.

In order to solve the above problems, there is provided a rechargeable electronic pen including: a casing; a storage element disposed within the casing; a charging connection terminal disposed within the casing so as to expose a charging contact to an outside of the electronic pen via an opening of the casing; a switch disposed between the storage element and the charging connection terminal; and a control member configured to perform opening and closing of the switch by being displaced with respect to the casing. The control member is displaceable with respect to the casing between a first state in which the charging contact of the charging connection terminal exposed to the outside of the electronic pen via the opening and a second state in which the charging contact of the charging connection terminal is not exposed to the outside of the electronic pen. When the control member is in the first state, the switch electrically connects the storage element to the charging contact of the charging connection terminal. When the control member is in the second state, the switch electrically disconnects the storage element from the charging contact of the charging connection terminal.

In the rechargeable electronic pen of the above-described configuration, when the control member is in the second state with respect to the casing, the charging contact of the charging connection terminal is not exposed to the outside of the electronic pen, and the switch electrically disconnects the storage element from the charging contact of the charging connection terminal.

Hence, according to the rechargeable electronic pen of the above-described configuration, the entry of dust into the charging contact of the charging connection terminal can be prevented. In addition, because the storage element and the charging contact portion of the charging connection terminal member are electrically disconnected from each other by the switch, even when an electric short circuit occurs between the connecting contacts of the charging connection terminal due to the entry of a drop of water or the like, the storage element is not connected to the charging connection terminal, and therefore the storage element is not short-circuited nor does a large current that may flow in the case of a short circuit occur. Thus, destruction of an internal circuit can also be prevented. In addition, a voltage stored in the storage element can be prevented from being discharged via the charging connection terminal.

When the control member is in the first state with respect to the casing, the charging contact of the charging connection terminal is exposed to the outside of the electronic pen via the opening portion, and the switch is in a closed state in which the switch electrically connects the storage element to the charging contact portion of the charging connection terminal. Hence, the storage element of the rechargeable electronic pen can be charged by inserting a jack at an end portion of a cable connected to a charger, for example, via the opening.

BRIEF DESCRIPTION OF THE DRAWINGS

FIG. 6 is a diagram of assistance in explaining an example of a configuration of parts of a third embodiment of the rechargeable electronic pen according to the present disclosure;

FIGS. 11A, 11B, and 11C are diagrams of assistance in explaining an example of a configuration of parts of a sixth embodiment of the rechargeable electronic pen according to the present disclosure;

DETAILED DESCRIPTION

Several embodiments of a rechargeable electronic pen according to the present disclosure will hereinafter be described with reference to the drawings.

First Embodiment

Figure 1:
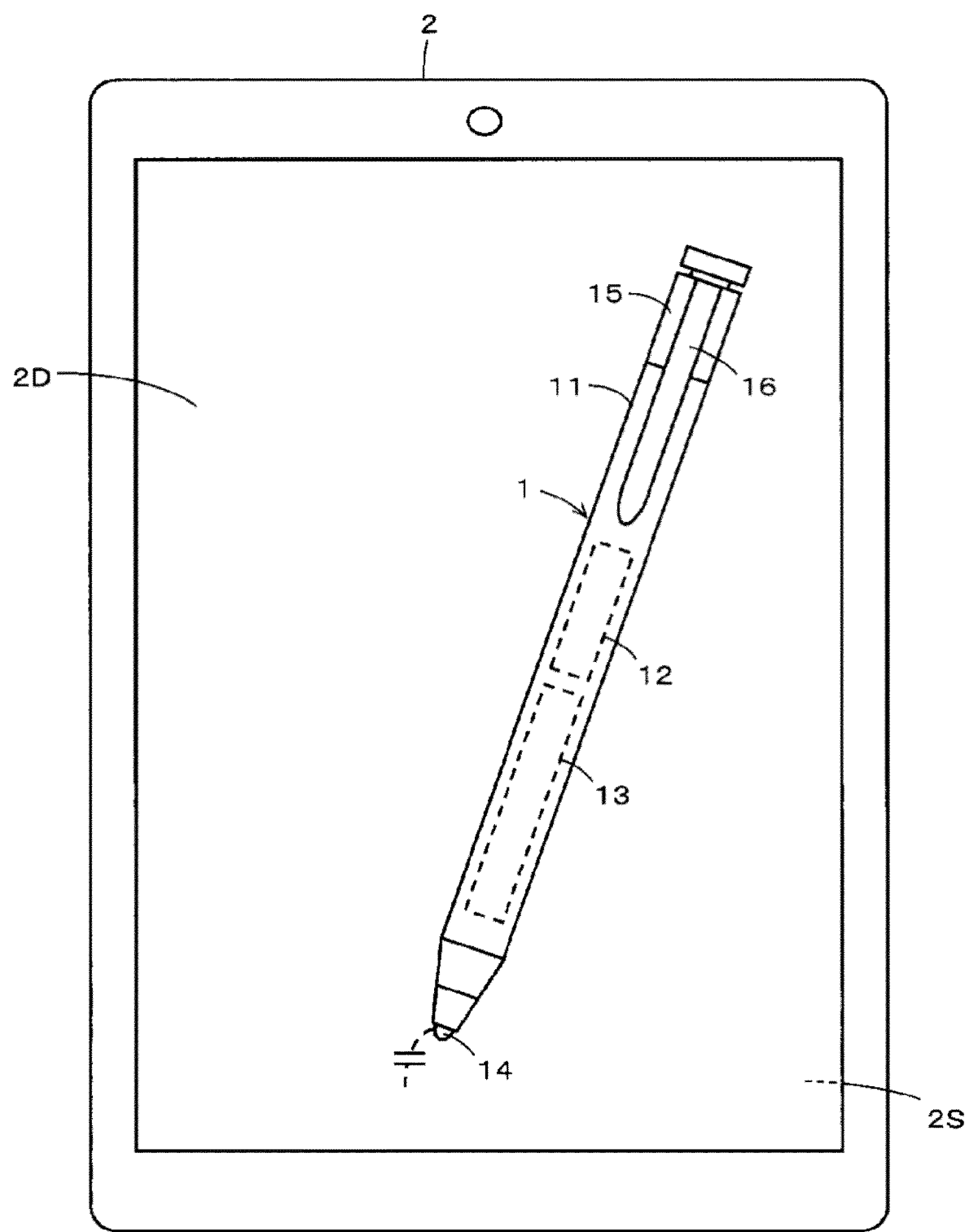
FIG. 1 is a diagram depicting an embodiment of a rechargeable electronic pen according to the present disclosure and an example of an electronic apparatus used in conjunction with the rechargeable electronic pen.

FIG. 1 depicts an example of a rechargeable electronic pen 1 according to a first embodiment of the present disclosure and a tablet type information terminal 2 as an example of an electronic apparatus using the rechargeable electronic pen 1 as an input section. The rechargeable electronic pen (hereinafter abbreviated to an electronic pen) 1 according to the present embodiment is an active capacitive type electronic pen that sends out a signal to a sensor of a position detecting device provided to the tablet type information terminal 2 by capacitive coupling.

In the present example, the tablet type information terminal 2 has, for example, a display screen 2D of a display device such as a liquid crystal display (LCD) or the like, and has, in the present example, a sensor 2S of a capacitive type position detecting device on an upper portion (top surface side) of the display screen 2D.

The electronic pen 1 is provided with a rechargeable battery 12 as an example of a storage element and an electronic circuit 13 within a hollow portion of a tubular casing 11. The electronic circuit 13 includes a signal transmitting circuit and a control circuit formed by a microprocessor, for example. The electronic circuit 13 is disposed on a printed circuit board not depicted in FIG. 1. The signal transmitting circuit and the control circuit of the electronic circuit 13 are supplied with a driving voltage from the rechargeable battery 12. On the basis of control of the control circuit, a signal from the signal transmitting circuit is sent out to the sensor 2S by capacitive coupling through a core body 14 having conductivity.

In the electronic pen 1 according to the present first embodiment, the rechargeable battery 12 is configured to be capable of being charged through a general-purpose USB connector as an example of a charging connection terminal member. In a case where a general-purpose USB connector is used, the rechargeable battery 12 can be charged from a personal computer having a USB connector via a connection cable. General-purpose USB connectors are thus convenient.

There are USB connectors of various sizes, including not only Type A of a regular size but also a small-sized Micro-B, Type C, and the like. Functions (the number of connection pins, kinds of connected signals, and the like) of USB connectors differ according to the size and shape of the USB connectors.

In the existing rechargeable electronic pens, USB connectors of the small-sized Micro-B type are used. However, with recent expansion of functionality of electronic pens, communication information exchanged through USB connectors and functions thereof have been increased, and there is thus a desire for the incorporation of USB connectors of Type C that has a larger number of connection pins and is slightly larger than the Micro-B type.

In the electronic pen 1 according to the present first embodiment, a USB connector of this type C is used as the charging connection terminal member of the rechargeable battery 12. The electronic pen 1 according to the present first embodiment is configured to be able to assume a first state in which an insertion port where a connecting contact portion of the USB connector as the charging connection terminal member is formed is exposed to the outside and a second state in which the insertion port is covered without being exposed.

Specifically, in the electronic pen 1 according to the present first embodiment, a cap member 15 is configured to be fitted to an opposite side of the tubular casing 11 from a core body 14 side in an axial direction (which opposite side will hereinafter be referred to as a rear end side) such that the cap member 15 is capable of sliding movement in the axial direction with respect to the casing 11. As depicted in FIG. 1, the cap member 15 in the present example is provided with a clip member 16 for holding the electronic pen 1 in a breast pocket or the like.

In the electronic pen 1 according to the present first embodiment, as in Patent Document 1 described above, the insertion port where the connecting contact portion of the USB connector is formed is disposed so as to be exposed from an opening portion of a side circumferential surface along the axial direction of the casing 11, and the cap member 15 is displaced by sliding movement in the axial direction with respect to the casing 11. The electronic pen 1 according to the present first embodiment is thus configured to be capable of assuming a first state in which the insertion port of the USB connector is exposed to the outside and a second state in which the insertion port of the USB connector is covered without being exposed to the outside. In the electronic pen 1 according to the present first embodiment, the cap member 15 constitutes a control member.

When a user intends to charge the rechargeable battery 12, the user sets the cap member 15 in the first state in which the insertion port of the USB connector is exposed from the opening portion of the casing 11, so that a connector jack of a USB cable can be inserted into the insertion port of the exposed USB connector. When the rechargeable battery 12 is not to be charged, the user sets the second state in which the insertion port of the USB connector is not exposed to the outside by covering the opening portion of the casing 11 by the cap member 15.

The electronic pen 1 according to the present first embodiment includes a switch member (switch member 18 to be described later) that establishes an electric connection between the USB connector and the rechargeable battery 12 to charge the rechargeable battery 12 in the first state in which the insertion port of the USB connector is exposed from the opening portion of the casing 11, and interrupts the electric connection between the USB connector and the rechargeable battery 12 in the second state in which the insertion port of the USB connector is not exposed from the opening portion of the casing 11. This configuration prevents the occurrence of an unexpected situation such as destruction of an internal circuit due to an electric short circuit or the like when the rechargeable battery 12 is not charged in the electronic pen 1 according to the present first embodiment.

Figure 2A:
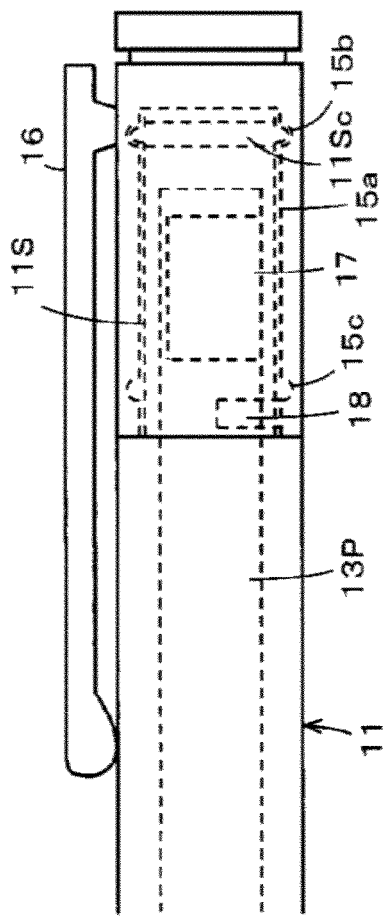
FIGS. 2A, 2B, and 2C are diagrams of assistance in explaining an example of a configuration of parts of a first embodiment of the rechargeable electronic pen according to the present disclosure.
Figure 2B:
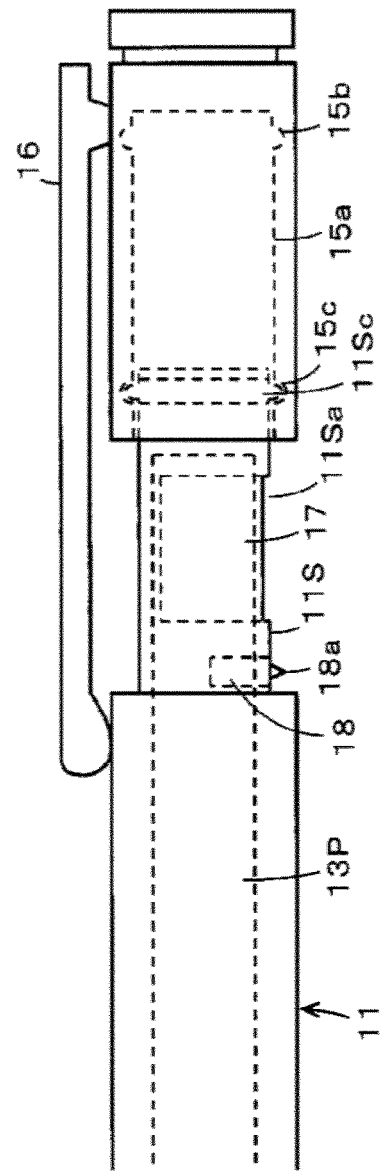
Figure 2C:
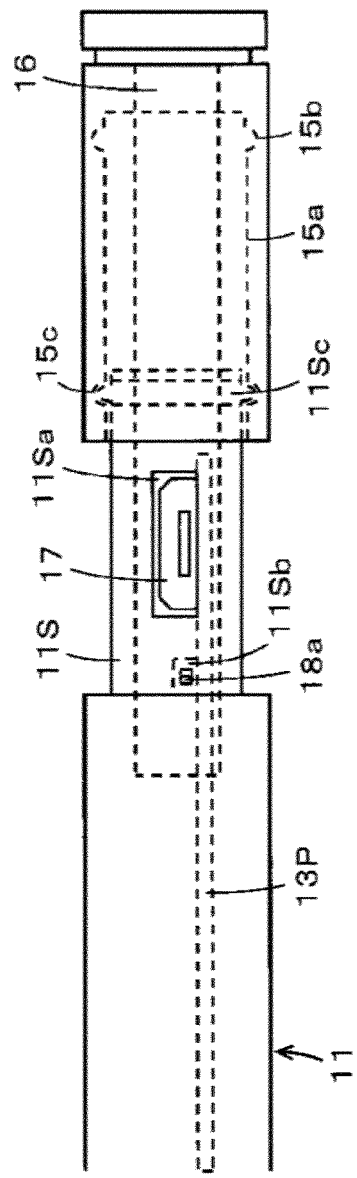

FIGS. 2A, 2B, and 2C are enlarged views of a part in which the casing 11 and the cap member 15 are coupled to each other. Referring to FIGS. 2A to 2C, description will be made of an example of a configuration for producing the first state when the rechargeable battery 12 can be charged and the second state when the charging cannot be performed in the electronic pen 1 described above.

FIG. 2A is a diagram of assistance in explaining the second state when the charging cannot be performed in the electronic pen 1 according to the present first embodiment. In addition, FIGS. 2B and 2C are diagrams of assistance in explaining the first state when the charging can be performed in the electronic pen 1 according to the present first embodiment. FIG. 2B is a diagram of the electronic pen 1 as viewed from a direction similar to that of FIG. 2A. FIG. 2C depicts a state in which the clip member 16 is positioned on an opposite side of a paper plane by rotating the electronic pen 1 in the state of FIG. 2B by 90 degrees.

As depicted in FIGS. 2A, 2B, and 2C, in the present first embodiment, the rear end side of the casing 11 of the electronic pen 1 is a small-diameter portion 11S having an outside diameter smaller than the other portion. The cap member 15 is configured to have a recessed hole 15a fitted with the small-diameter portion 11S of the casing 11.

In the present example, a USB connector 17 and a switch member 18 arranged on a printed circuit board 13P are provided within a hollow portion of the small-diameter portion 11S of the casing 11. As depicted in FIGS. 2B and 2C, an opening portion 11Sa is formed in the small-diameter portion 11S of the casing 11 so as to expose, to the outside, the insertion port in which the connecting contact portion of the USB connector 17 faces the outside. In the present example, the USB connector 17 is Type C, and is thus slightly larger. The USB connector 17 is therefore mounted horizontally on the printed circuit board 13P, and the opening portion 11Sa is correspondingly formed such that the longitudinal direction of the opening portion 11Sa is a direction along the axial direction of the small-diameter portion 11S of the casing 11. The insertion port in which the connecting contact portion of the USB connector 17 is formed is configured to be exposed to the outside via the opening portion 11Sa.

In addition, in the present example, the switch member 18 has a protrusion 18a that is in a state of projecting from the casing in a normal state, and is elastically displaced so as to be housed within the casing by being pressed. In the present example, the switch member 18 is in a closed state (switched-on state) while the protrusion 18a is in a projecting state, and is in an opened state (switched-off state) while the protrusion 18a is housed within the casing by being pressed.

As depicted in FIG. 2B and FIG. 2C, in the small-diameter portion 11S of the casing 11, an opening portion 11Sb is formed at a position corresponding to the protrusion 18a of the switch member 18 disposed on the printed circuit board 13P. The switch member 18 is disposed on the printed circuit board 13P such that the protrusion 18a protrudes outward of the outer circumferential surface of the small-diameter portion 11S from the opening portion 11Sb of the small-diameter portion 11S.

In the present example, in order to lock the small-diameter portion 11S of the casing 11 and the cap member 15 to each other in the axial direction in the first state and the second state, a protruding portion 11Sc bulged in a ring shape is formed on an end side of the small-diameter portion 11S of the casing 11, and ring-shaped recessed grooves 15b and 15c are formed within the recessed hole 15a of the cap member 15.

Figure 3A:
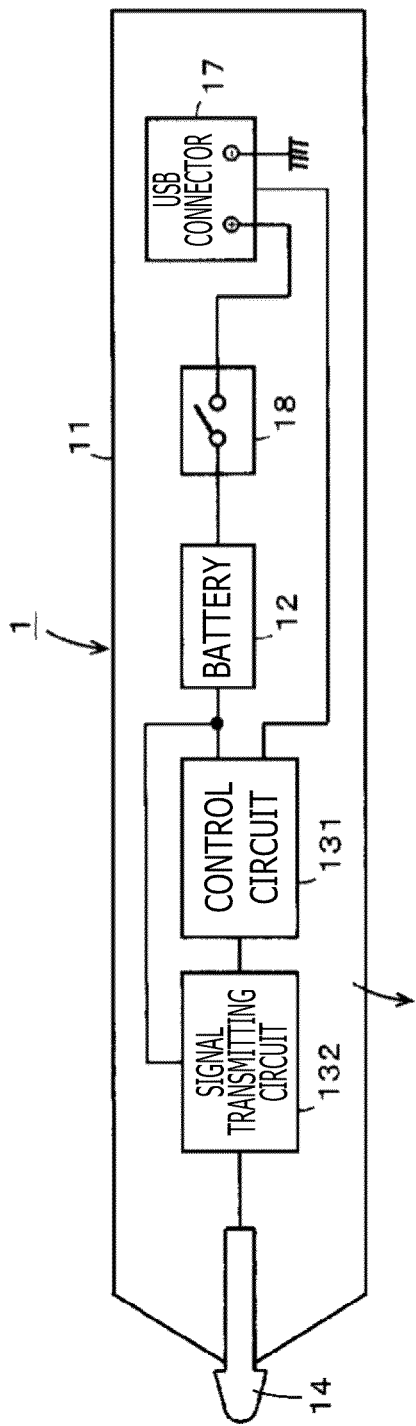
FIGS. 3A and 3B are diagrams of assistance in explaining an example of an electric configuration in the first embodiment of the rechargeable electronic pen according to the present disclosure.
Figure 3B:
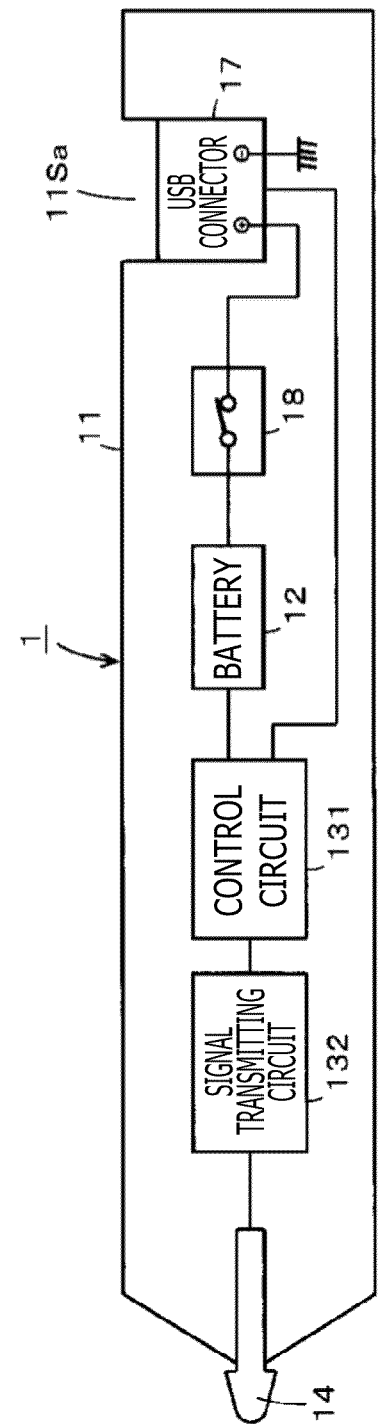

An electric configuration within the electronic pen 1 according to the present first embodiment will next be described with reference to FIGS. 3A and 3B. As depicted in FIGS. 3A and 3B, the electronic pen 1 according to the present first embodiment includes the rechargeable battery 12, the USB connector 17, a switch member 18, a control circuit 131, and a signal transmitting circuit 132 within the casing 11.

The USB connector 17 has a charging negative side terminal grounded, and has a positive side terminal connected to the rechargeable battery 12 through the switch member 18. A voltage stored in the rechargeable battery 12 is supplied, as a driving voltage for the control circuit 131 and the signal transmitting circuit 132, to the control circuit 131 and the signal transmitting circuit 132.

The signal transmitting circuit 132 is connected to the core body 14 having conductivity. The control circuit 131 is formed by a microprocessor, for example. The control circuit 131 controls the content of an output signal from the signal transmitting circuit 132, and controls signal output timing and the like.

In the present example, the USB connector 17 has a terminal for transmitting and receiving signals. The terminal for transmitting and receiving signals is connected to the control circuit 131. Thus, a signal from the outside is supplied to the control circuit 131 through the USB connector 17, and a signal from the control circuit 131 is transmitted to the outside through the USB connector 17. Incidentally, while one terminal for transmitting and receiving signals is depicted in FIGS. 3A and 3B, it is needless to say that a plurality of terminals for transmitting and receiving signals may be provided.

In the electronic pen 1 according to the first embodiment, which is configured as described above, when the cap member 15 is fitted onto the small-diameter portion 11S of the casing 11 and pushed in, the ring-shaped protruding portion 11Sc of the small-diameter portion 11S is fitted into the ring-shaped recessed groove 15b of the recessed hole 15a of the cap member 15. The cap member 15 is thus locked to the casing 11.

In this state, the opening portion 11Sa of the small-diameter portion 11S of the casing 11 is covered by the cap member 15, and therefore the insertion port of the USB connector 17 is not exposed to the outside. In addition, the protrusion 18a of the switch member 18 is set in a state of being pushed in within the casing by the cap member 15, so that the switch member 18 is in an opened state (switched-off state), as depicted in FIG. 3A. That is, the electronic pen 1 in the state of FIG. 2A is in the second state.

In the second state, as depicted in FIG. 3A, electric connection between the USB connector 17 and the rechargeable battery 12 is interrupted by the switch member 18. Therefore, even when water enters the insertion port of the USB connector 17 through a clearance between the cap member 15 and the small-diameter portion 11S of the casing 11, and a short circuit occurs between the connecting contacts of the USB connector 17, a current from the rechargeable battery 12 does not flow through the USB connector 17. It is therefore possible to prevent the occurrence of an unexpected situation such as destruction of an internal circuit or the like. It is also possible to prevent the voltage stored in the rechargeable battery 12 from being discharged via the USB connector 17 side.

Next, when the cap member 15 is slidingly moved to an opposite side from the pen tip side of the core body 14 in the axial direction from the second state depicted in FIG. 2A, the ring-shaped protruding portion 11Sc of the small-diameter portion 11S is fitted into the ring-shaped recessed groove 15c of the recessed hole 15a of the cap member 15. The cap member 15 is thus locked to the casing 11.

In this state, as depicted in FIGS. 2B and 2C, the opening portion 11Sa of the small-diameter portion 11S of the casing 11 is exposed without being covered by the cap member 15. Therefore, as depicted in FIG. 3C, the insertion port in which the connecting contacts of the USB connector 17 are formed is exposed to the outside via the opening portion 11Sa. In addition, because the pressing of the protrusion 18a of the switch member 18 by the cap member 15 ceases, the protrusion 18a protrudes to the outside as depicted in FIG. 2B, so that the switch member 18 is in a closed state (switched-on state) as depicted in FIG. 3B. That is, the electronic pen 1 in the state of FIGS. 2B and 2C is in the first state.

In the first state, as depicted in FIG. 3B, electric connection between the USB connector 17 and the rechargeable battery 12 is established through the switch member 18. Therefore, when the connector jack at an end portion of the USB cable is inserted into the insertion port of the USB connector 17, a charging current flows through the USB connector 17 to the rechargeable battery 12, so that the charging of the rechargeable battery 12 is performed.

Incidentally, in the above description, the first state and the second state are produced by sliding movement of the cap member 15 in the axial direction. However, the clip member 16 is provided to the cap member 15. Therefore, depending on a fitting position in the side circumferential surface direction between the cap member 15 and the small-diameter portion 11S of the casing 11, the clip member 16 may cover a space above the opening portion 11Sa, and there is a fear that the connector jack of the USB cable cannot be inserted into the insertion port of the USB connector 17. However, in the electronic pen 1 according to the first embodiment, in such a case, the position of the clip member 16 can be prevented from being in the space above the opening portion 11Sa by rotating the cap member 15 with respect to the small-diameter portion 11S of the casing 11. In this case, the cap member 15 as a control member performs displacements constituted of a sliding movement in the axial direction with respect to the casing 11 and a rotational movement with the axial direction as a rotational center with respect to the casing 11.

Incidentally, the cap member 15 may be inhibited from rotating with respect to the small-diameter portion 11S of the casing 11 in a state in which the position of the clip member 16 does not coincide with the opening portion 11Sa of the small-diameter portion 11S of the casing 11, by forming a ridge or a recessed groove along the axial direction at a particular position on the peripheral side surface of the small-diameter portion 11S of the casing 11, and forming a recessed groove or a ridge corresponding to the ridge or the recessed groove of the small-diameter portion 11S at a particular position on the inner circumferential surface of the recessed hole 15a of the cap member 15.

Incidentally, the clip member 16 may not be provided to the electronic pen 1 according to the foregoing first embodiment. In addition, in the second state, the cap member 15 may be detached from the small-diameter portion 11S of the casing 11 without being locked to the small-diameter portion 11S of the casing 11.

Second Embodiment

In the foregoing first embodiment, the control member is formed by a cap member. On the other hand, in an electronic pen 1A according to a second embodiment to be described in the following, the control member is formed by a clip member 16A. In the following description of the second embodiment, constituent parts similar to those of the electronic pen 1 according to the first embodiment are identified by the same reference numerals, and detailed description thereof will be omitted.

Figure 4C:
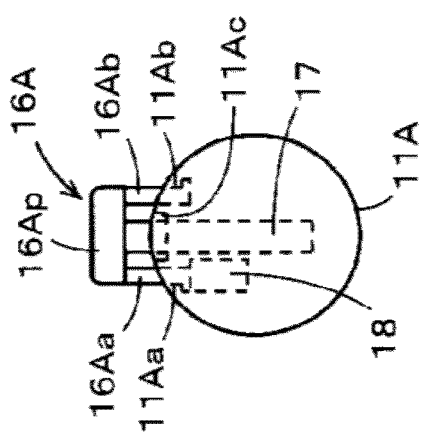
FIGS. 4A, 4B, and 4C are diagrams of assistance in explaining an example of a configuration of parts of a second embodiment of the rechargeable electronic pen according to the present disclosure.
Figure 4A:
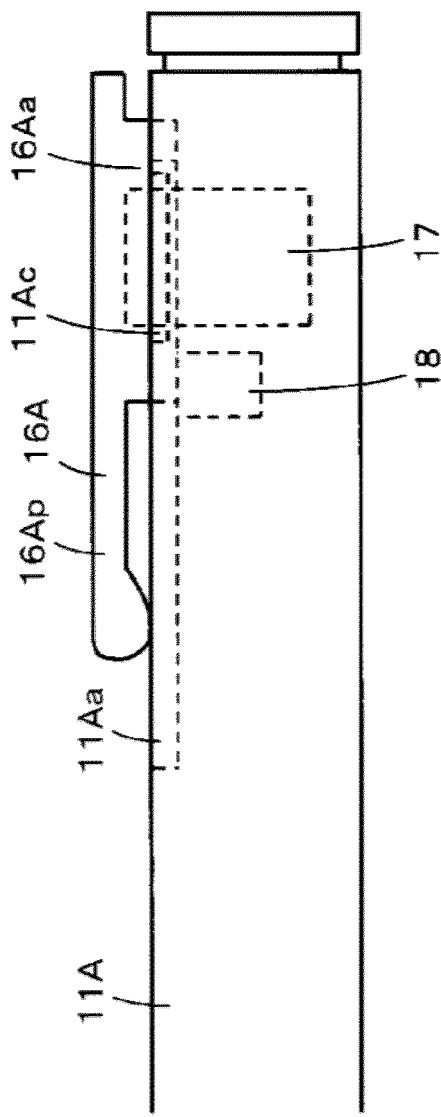
Figure 4B:
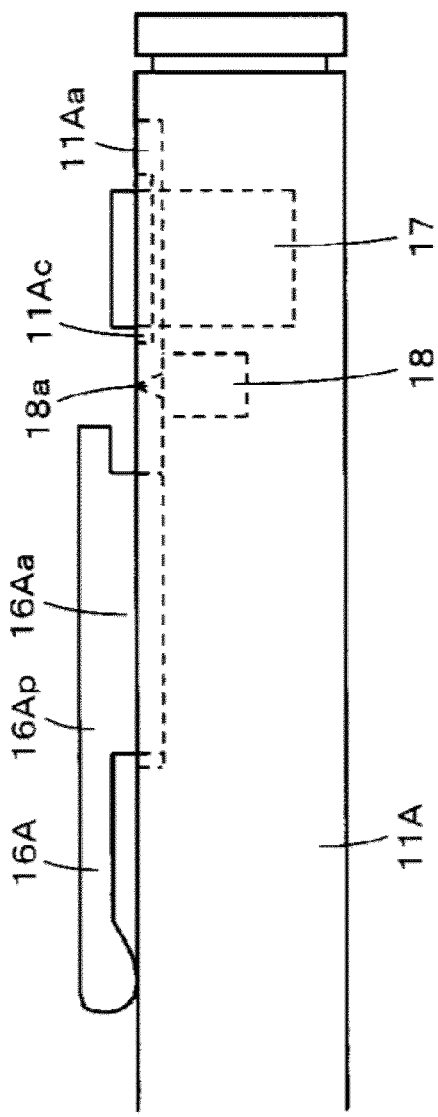

FIGS. 4A, 4B, and 4C are diagrams of assistance in explaining an example of a configuration of parts of the electronic pen 1A according to the second embodiment. FIGS. 4A and 4B are diagrams depicting a configuration on a rear end side of the electronic pen 1A according to the second embodiment. FIG. 4A is a diagram depicting a second state produced by the clip member 16A as a control member. FIG. 4B is a diagram depicting a first state produced by the clip member 16A as a control member. In addition, FIG. 4C is a diagram of the electronic pen 1A according to the second embodiment as viewed in the axial direction from the rear end side of the electronic pen 1A.

As depicted in FIGS. 4A, 4B, and 4C, the clip member 16A of the electronic pen 1A according to the second embodiment includes: a plate-shaped clip piece 16Ap that is elastically displaceable and has the axial direction of the electronic pen 1A as a longitudinal direction thereof; and two wall portions 16Aa and 16Ab that extend from both sides in a width direction of a part having a length about half that of the clip piece 16Ap on the rear end side of the clip piece 16Ap to the casing 11A side of the electronic pen 1A in a direction orthogonal to the plate-shaped flat surface of the clip piece 16Ap.

In the electronic pen 1A according to the second embodiment, a casing 11A does not have a small-diameter portion 11S as in the casing 11 of the electronic pen 1 according to the first embodiment. Instead, as depicted in FIGS. 4A, 4B, and 4C, slide grooves 11Aa and 11Ab fitted with end edges of the two wall portions 16Aa and 16Ab of the clip member 16A (see FIG. 4C in particular) are provided in the side circumferential surface on the rear end side of the tubular casing 11A of the electronic pen 1A according to the second embodiment. As depicted in FIGS. 4A and 4B, the slide grooves 11Aa and 11Ab are formed along the axial direction of the casing 11A. The clip member 16A can be slidingly moved in the axial direction along the slide grooves 11Aa and 11Ab.

In the electronic pen 1A according to the second embodiment, a connecting contact portion of a USB connector 17 and an opening portion 11Ac of the casing 11A can be covered by a space formed by the two wall portions 16Aa and 16Ab and the clip piece 16Ap of the clip member 16A. That is, in the present example, the length in the axial direction of the wall portions 16Aa and 16Ab of the clip member 16A is selected to be longer than the length in the longitudinal direction of an insertion port in which the connecting contact portion of the USB connector 17 is formed.

As depicted in FIG. 4C, an opening portion 11Ac for exposing the insertion port of the USB connector 17 to the outside is provided between the two slide grooves 11Aa and 11Ab in the side circumferential surface on the rear end side of the casing 11A. The opening portion 11Ac is formed in the side circumferential surface of the casing 11A such that the longitudinal direction of the opening portion 11Ac is the axial direction of the casing 11A. The formation position of the opening portion 11Ac is such that the opening portion 11Ac is covered by the space formed by the two wall portions 16Aa and 16Ab and the clip piece 16Ap of the clip member 16A at a time of the second state in which the clip member 16A is located on the rearmost end side of the casing 11A, as depicted in FIG. 4A, and such that the insertion port of the USB connector 17 is exposed to the outside through the opening portion 11Ac at a time of the first state in which the clip member 16A is moved to a pen tip side in the axial direction of the casing 11A, as depicted in FIG. 4B.

In the electronic pen 1A according to the second embodiment, the USB connector 17 is mounted on and attached to a printed circuit board not depicted in the figures. As depicted in FIGS. 4A to 4C, the USB connector 17 is attached such that the insertion port of the USB connector 17 slightly protrudes to the outside through the opening portion 11Ac.

In the electronic pen 1A according to the second embodiment, as depicted in FIGS. 4A to 4C, a switch member 18 is disposed on the printed circuit board in a state in which a protrusion 18a protrudes via an opening (not depicted) formed in the casing 11A in a path in which one of the two wall portions 16Aa and 16Ab of the clip member 16A, that is, the wall portion 16Aa in the example of FIG. 4C slidingly moves in the axial direction.

In this case, as depicted in FIG. 4A, at a time of the second state in which the clip member 16A is located on the rearmost end side of the casing 11A, the wall portion 16Aa of the clip member 16A pushes the protrusion 18a of the switch member 18 into the casing, so that the switch member 18 is in an opened state (switched-off state).

Then, as depicted in FIG. 4B, at a time of the first state in which the clip member 16A is moved to the pen tip side in the axial direction of the casing 11A, the insertion port of the USB connector 17 that has been covered by the space formed by the two wall portions 16Aa and 16Ab and the clip piece 16Ap of the clip member 16A and protrudes through the opening portion 11Ac of the casing 11A is exposed to the outside, and the protrusion 18a of the switch member 18 protrudes from the opening of the casing 11A after being released from depression by the wall portion 16Aa of the clip member 16A. The switch member 18 in the first state of FIG. 4B is in a closed state (switched-on state).

Incidentally, the length in the axial direction of the slide grooves 11Aa and 11Ab of the casing 11A is selected to be a length such that a change can be made from the second state depicted in FIG. 4A to the first state depicted in FIG. 4B.

Figure 5A:
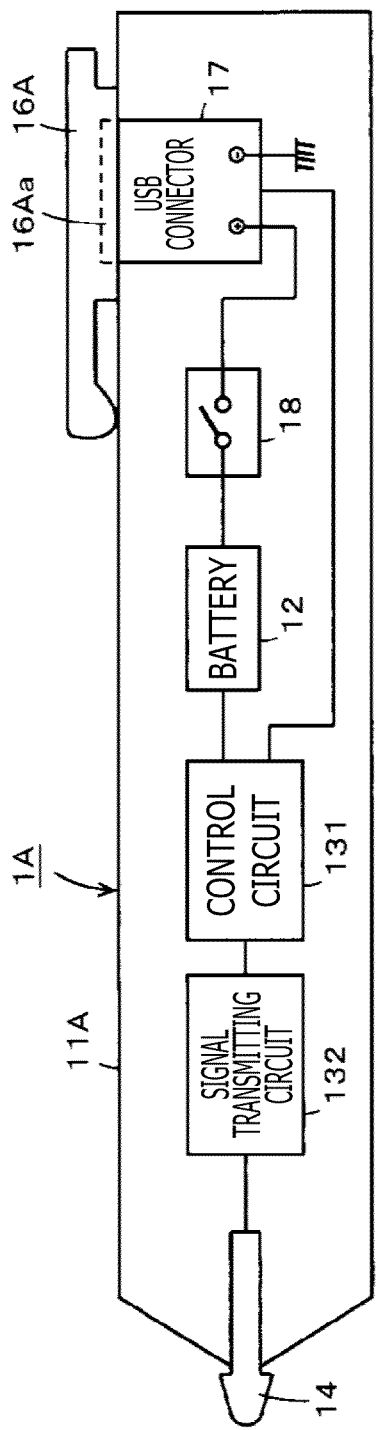
FIGS. 5A and 5B are diagrams of assistance in explaining an example of an electric configuration in the second embodiment of the rechargeable electronic pen according to the present disclosure.
Figure 5B:
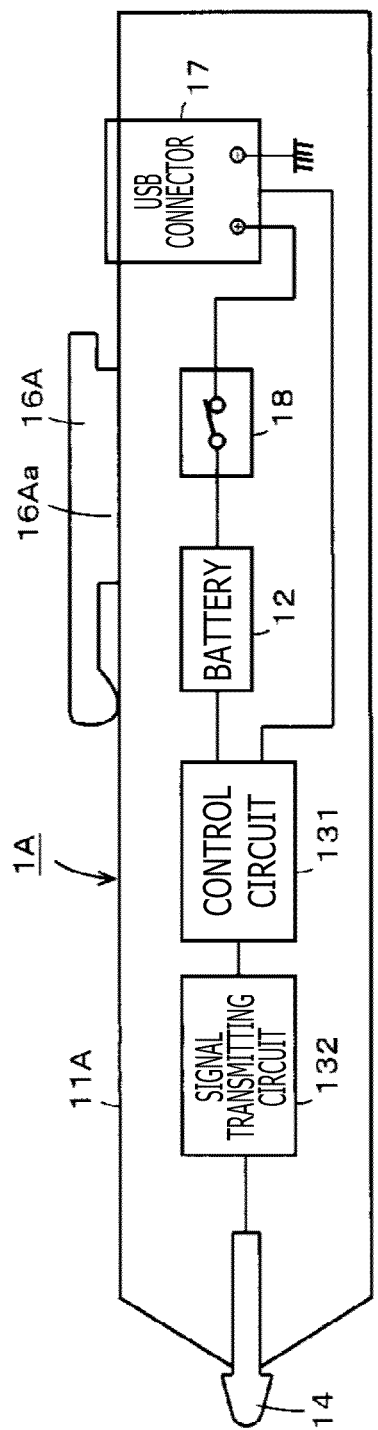

An internal electric configuration of the electronic pen 1A according to the second embodiment is as depicted in FIGS. 5A and 5B, and is similar to that of the electronic pen 1 according to the foregoing first embodiment. However, in the second embodiment, the control member is the clip member 16A, and a user performs switching operation control between the first state and the second state by sliding movement of the clip member 16A in the axial direction.

That is, in the electronic pen 1A according to the second embodiment, at a time of the second state in which the clip member 16A is present on the rearmost end side of the casing 11A, as depicted in FIG. 4A and FIG. 5A, the insertion port of the USB connector 17 is not exposed to the outside by being covered by the space formed by the two wall portions 16Aa and 16Ab and the clip piece 16Ap of the clip member 16A, and the switch member 18 is in an opened state (switched-off state) with the protrusion 18a of the switch member 18 depressed by the wall portion 16Aa of the clip member 16A.

Hence, as depicted in FIG. 5A, electric connection between the USB connector 17 and the rechargeable battery 12 is interrupted by the switch member 18. Therefore, even when water enters the insertion port of the USB connector 17 through a clearance between the clip member 16A and the USB connector 17, and a short circuit occurs between the connecting contacts of the USB connector 17, a current from the rechargeable battery 12 does not flow through the USB connector 17. It is therefore possible to prevent the occurrence of an unexpected situation such as destruction of an internal circuit or the like.

Then, when the user slides the clip member 16A in the axial direction of the casing 11A and sets the clip member 16A in the first state depicted in FIG. 4B, the insertion port of the USB connector 17 is exposed to the outside, as depicted in FIG. 5B, and the switch member 18 is set in a closed state (switched-on state) after depression of the protrusion 18a by the wall portion 16Aa of the clip member 16A is released.

Hence, as depicted in FIG. 5B, electric connection is established between the USB connector 17 and the rechargeable battery 12 through the switch member 18. Therefore, when the connector jack at the end portion of the USB cable is inserted into the insertion port of the USB connector 17, a charging current flows through the USB connector 17 to the rechargeable battery 12, so that the charging of the rechargeable battery 12 is performed.

Incidentally, in the above description, the protrusion 18a of the switch member 18 is depressed by one of the wall portions 16Aa and 16Ab of the clip member 16A. However, in the first state of FIG. 4A, end parts of the two wall portions 16Aa and 16Ab at a position of depressing the protrusion 18a of the switch member 18 may be bridged by a plate-shaped body, and the protrusion 18a of the switch member 18 may be depressed by the plate-shaped body. In this case, the USB connector 17 and the switch member 18 can be arranged on the printed circuit board by merely making the positions in the axial direction of the USB connector 17 and the switch member 18 differ from each other.

Incidentally, while the wall portions 16Aa and 16Ab of the clip member 16A are formed on a part in the longitudinal direction of the clip piece 16Ap, the wall portions 16Aa and 16Ab of the clip member 16A may be formed over the whole in the longitudinal direction of the clip piece 16Ap.

Third Embodiment

In the electronic pen 1 according to the foregoing first embodiment and the electronic pen 1A according to the foregoing second embodiment, switching control is performed so as to produce the first state and the second state by sliding movement of the cap member 15 and the clip member 16A as a control member in the axial direction of the casings of the electronic pens. However, switching control can also be performed so as to produce the first state and the second state by displacing the control member in a direction of rotation about an axis extending in the axial direction of the casing of the electronic pen. A third embodiment to be described in the following is an example of an electronic pen in which switching control is performed so as to produce the first state and the second state by displacing the control member in a rotational direction.

Figure 7A:
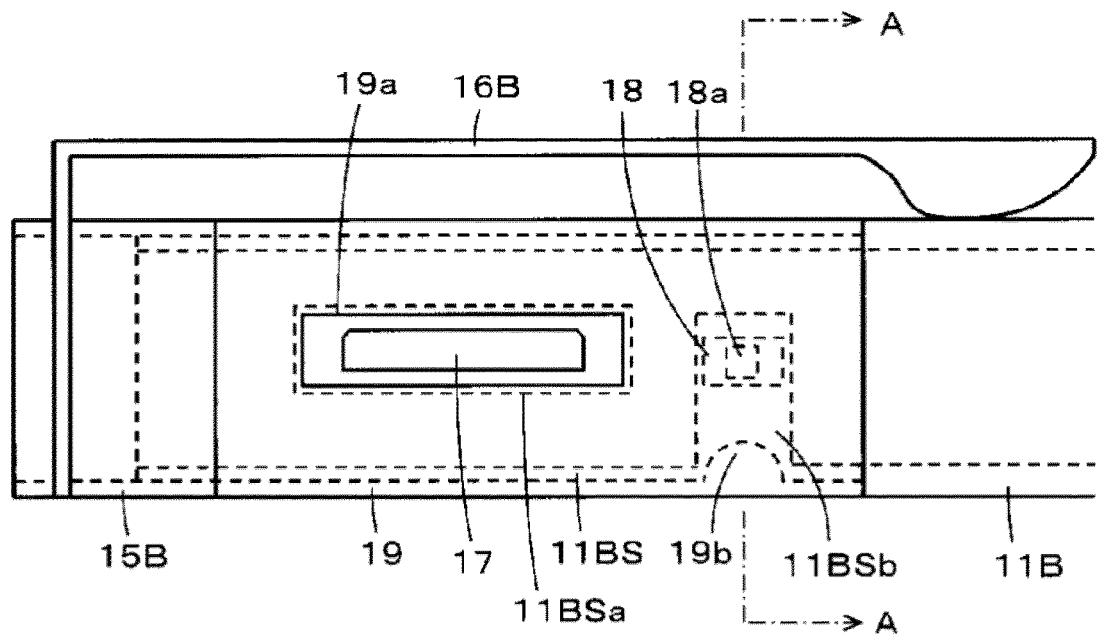
FIGS. 7A and 7B are diagrams of assistance in explaining an example of a configuration of parts of the third embodiment of the rechargeable electronic pen according to the present disclosure.
Figure 7B:
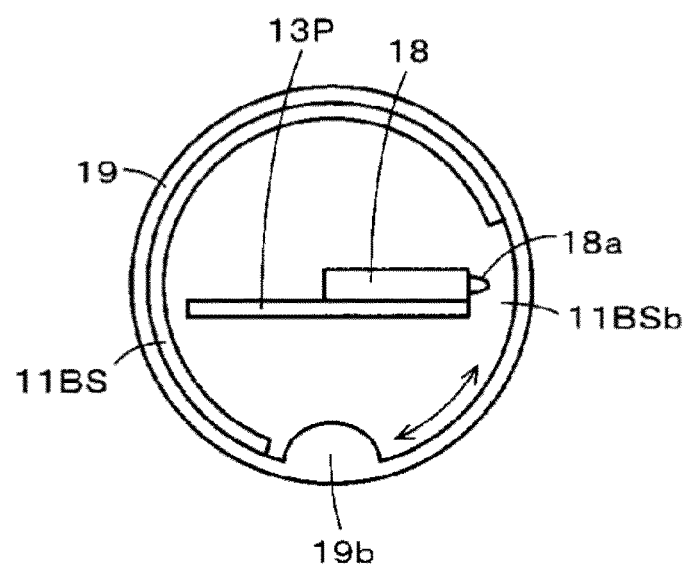

FIG. 6 and FIGS. 7A and 7B are diagrams of assistance in explaining parts of an electronic pen 1B according to the present third embodiment. FIG. 6 is a perspective view of the rear end side of the electronic pen 1B according to the present third embodiment, and is a diagram of a first state, as will be described later. In addition, FIG. 7A is a side view of the rear end side of the electronic pen 1B according to the present third embodiment, and is a diagram of a second state. FIG. 7B is a cross-sectional view taken along a line A-A of FIG. 7A. Also in the electronic pen 1B according to the present third embodiment, parts similar to those of the electronic pen 1 according to the first embodiment are identified by the same reference numerals, and description thereof will be omitted.

As in the casing 11 of the electronic pen 1 according to the first embodiment, a casing 11B of the electronic pen 1B of the present third embodiment has a small-diameter portion 11BS on a rear end side in an axial direction (see FIGS. 7A and 7B). In addition, as depicted in FIG. 6 and FIGS. 7A and 7B, the electronic pen 1B according to the present third embodiment is provided with a cap member 15B and a ring member 19 as members fitted onto the small-diameter portion 11BS of the casing 11B.

Specifically, in the electronic pen 1B according to the present third embodiment, the ring member 19 is first fitted onto the small-diameter portion 11BS of the casing 11B in a state of being rotatable with respect to the small-diameter portion 11BS. The small-diameter portion 11BS of the casing 11B protrudes further to the rear end side even after the ring member 19 is fitted. The cap member 15B is fitted onto the protruding part of the small-diameter portion 11BS of the casing 11B in a state of being non-rotatable with respect to the small-diameter portion 11B S in the present example.

As in the electronic pen 1 according to the first embodiment, a USB connector 17 and a switch member 18 arranged on a printed circuit board 13P are disposed within a hollow portion of the small-diameter portion 11BS of the casing 11B. As depicted in FIG. 6 and FIGS. 7A and 7B, in the electronic pen 1B according to the present third embodiment, as in the electronic pen 1 according to the foregoing first embodiment, an opening portion 11BSa for exposing the insertion port of the USB connector 17 to the outside is formed in the side circumferential surface of the small-diameter portion 11BS of the casing 11B such that the axial direction is the longitudinal direction of the opening portion 11BSa, and an opening portion 11BSb for exposing a protrusion 18a of the switch member 18 to the outside is formed.

Incidentally, in the present example, a clip member 16B is fixed and attached to the cap member 15B. However, the cap member 15B is fixed to the small-diameter portion 11BS of the casing 11B at a rotational direction position such that the clip member 16B does not cover a space above the opening portion 11BSa formed in the small-diameter portion 11BS of the casing 11B and thus does not cause a problem in the insertion of the connector jack of the USB cable into the insertion port of the USB connector 17. In the present example, the opening portion 11BSa of the small-diameter portion 11BS of the casing 11B and the clip member 16B fixed to the cap member 15B are located at positions different from each other by 90 degrees in a rotational direction.

In the electronic pen 1B according to the present third embodiment, the ring member 19 has an opening portion 19a formed therein so as to coincide with the opening portion 11BSa of the small-diameter portion 11BS of the casing 11B. In addition, a protruding portion 19b capable of depressing the protrusion 18a of the switch member 18 is formed on the inner wall surface of the ring member 19.

As described above, in the electronic pen 1B according to the present third embodiment, the ring member 19 constitutes a control member. The ring member 19 is displaced so as to be rotated with respect to the small-diameter portion 11BS of the casing 11B, thereby producing a second state depicted in FIG. 6 and producing a first state depicted in FIGS. 7A and 7B. The opening portion 19a and the protruding portion 19b of the ring member 19 are arranged in a positional relation such that the first state and the second state can be produced by the rotation of the ring member 19. In the present example, the opening portion 19a and the protruding portion 19b of the ring member 19 are set at positions different from each other by 90 degrees in the rotational direction.

Specifically, in the electronic pen 1B according to the present third embodiment, as depicted in FIG. 6, the second state is a state in which the opening portion 19a of the ring member 19 is located directly below the clip member 16B and thus the opening portion 19a is hidden by the clip member 16B. In the second state, the opening portion 11BSa of the small-diameter portion 11B S of the casing 11B is present at a position different from that of the opening portion 19a of the ring member 19 by 90 degrees in the rotational direction. Therefore, the opening portion 11BSa of the small-diameter portion 11BS of the casing 11B is covered by the ring member 19, and the insertion port of the USB connector 17 is not exposed to the outside. At this time, as depicted in FIG. 6, the protruding portion 19b of the ring member 19 depresses the protrusion 18a of the switch member 18, so that the switch member 18 is in an opened state (switched-off state).

Hence, as depicted in FIG. 3A, electric connection between the USB connector 17 and the rechargeable battery 12 is interrupted by the switch member 18. Thus, even when water enters the insertion port of the USB connector 17 through a clearance between the ring member 19 and the small-diameter portion 11BS of the casing 11B, and a short circuit occurs between the connecting contacts of the USB connector 17, a current from the rechargeable battery 12 does not flow through the USB connector 17. It is therefore possible to prevent the occurrence of an unexpected situation such as destruction of an internal circuit or the like.

The first state is obtained when the opening portion 19a of the ring member 19 and the opening portion 11BSa of the small-diameter portion 11BS of the casing 11B are made to coincide with each other as depicted in FIG. 7A by rotating the ring member 19 by 90 degrees from the state of FIG. 6. That is, as depicted in FIG. 7A, the insertion port of the USB connector 17 is exposed to the outside through the opening portion 11BSa of the small-diameter portion 11BS and the opening portion 19a of the ring member 19. At this time, the protruding portion 19b of the ring member 19 is rotated and moved by 90 degrees within the opening portion 11BSb of the small-diameter portion 11BS, resulting in a state as depicted in FIG. 7B. The switch member 18 is thus set in a closed state (switched-on state), in which state the protrusion 18a not depressed by the protruding portion 19b protrudes.

Hence, as depicted in FIG. 3B, electric connection is established between the USB connector 17 and the rechargeable battery 12 through the switch member 18. When the connector jack at the end portion of the USB cable is inserted into the insertion port of the USB connector 17, a charging current flows through the USB connector 17 to the rechargeable battery 12, so that the charging of the rechargeable battery 12 is performed.

Fourth Embodiment

As with the third embodiment, a fourth embodiment is also an example in which the first state and the second state described above are produced in an electronic pen by rotating a control member.

Figure 8A:
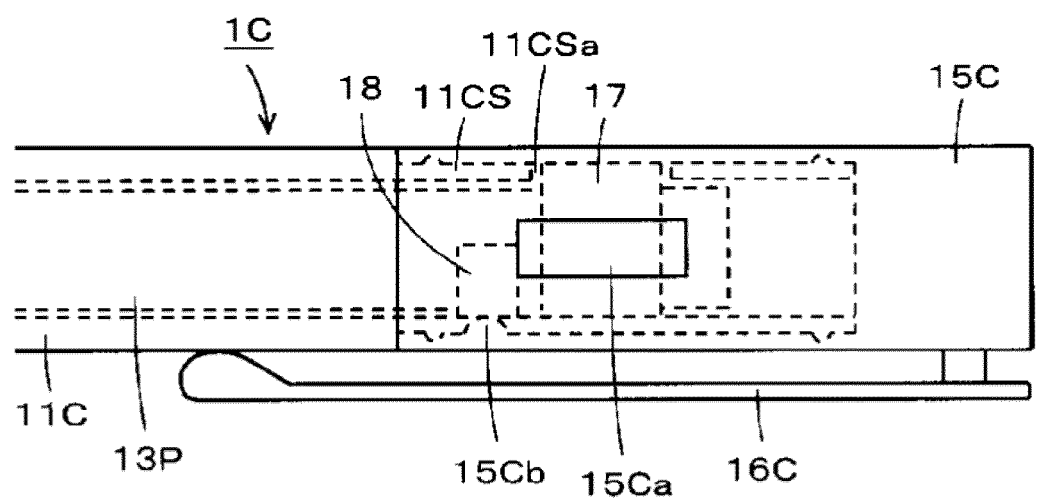
FIGS. 8A and 8B are diagrams of assistance in explaining an example of a configuration of parts of a fourth embodiment of the rechargeable electronic pen according to the present disclosure.
Figure 8B:
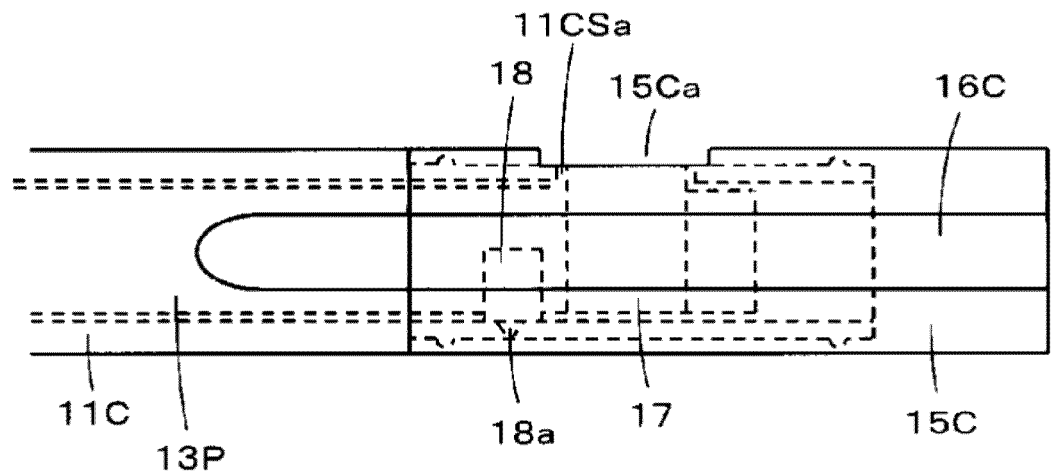

FIGS. 8A and 8B are diagrams of assistance in explaining parts of an electronic pen 1C according to the present fourth embodiment. FIG. 8A is a diagram of the electronic pen 1C according to the present fourth embodiment in the second state. FIG. 8B is a diagram of the electronic pen 1C according to the present fourth embodiment in the first state. Also in the electronic pen 1C according to the present fourth embodiment, parts similar to those of the electronic pen 1 according to the first embodiment are identified by the same reference numerals, and description thereof will be omitted.

In the electronic pen 1C according to the present fourth embodiment, the ring member 19 according to the third embodiment does not exist, but instead a cap member 15C is configured to rotate as a control member.

Specifically, as with the casings of the electronic pen 1 according to the first embodiment and the electronic pen 1B according to the third embodiment, a casing 11C of the electronic pen 1C according to the present fourth embodiment has a small-diameter portion 11CS on a rear end side in an axial direction. In the electronic pen 1C according to the present fourth embodiment, as depicted in FIGS. 8A and 8B, the cap member 15C is provided as a member fitted onto the small-diameter portion 11CS of the casing 11C. In this case, the cap member 15C is fitted in a state of being rotatable with respect to the small-diameter portion 11CS of the casing 11C of the electronic pen 1C.

As in the electronic pen 1 according to the first embodiment, a USB connector 17 and a switch member 18 arranged on a printed circuit board 13P are disposed within a hollow portion of the small-diameter portion 11CS of the casing 11C. As depicted in FIGS. 8A and 8B, in the electronic pen 1C according to the present fourth embodiment, as in the electronic pen 1 according to the foregoing first embodiment, an opening portion 11CSa for exposing the insertion port of the USB connector 17 to the outside is formed in the peripheral side surface of the small-diameter portion 11CS of the casing 11C.

In the electronic pen 1C according to the present fourth embodiment, an opening portion 15Ca coinciding with the opening portion 11CSa of the small-diameter portion 11CS of the casing 11C is formed in the cap member 15C. In addition, a protruding portion 15Cb capable of depressing a protrusion 18a of the switch member 18 is formed on the inner wall surface of the cap member 15C.

Incidentally, in the present example, a clip member 16C is fixed and attached to the cap member 15C. However, the opening portion 15Ca is formed at a rotational angle position different from that of the clip member 16C so that the clip member 16C does not cover a space above the opening portion 15Ca and thus does not cause a problem in the insertion of the connector jack of the USB cable into the insertion port of the USB connector 17. In the present example, the opening portion 15Ca of the cap member 15C and the clip member 16C fixed to the cap member 15C are located at positions different from each other by 90 degrees in a rotational direction.

In addition, in the present example, a direction in which the insertion port of the USB connector 17 faces and a direction in which the protrusion 18a of the switch member 18 protrudes are opposite directions (different from each other by 180 degrees). Therefore, the position of the opening portion 15Ca of the cap member 15C and the position of the protruding portion 15Cb are positions different from each other by 90 degrees in the rotational direction.

In the electronic pen 1C according to the present fourth embodiment, as depicted in FIG. 8A, the second state is a state in which the opening portion 15Ca of the cap member 15C is present at a rotational angle position different from that of the opening portion 11CSa of the small-diameter portion 11CS of the casing 11C by 90 degrees. In the second state, the opening portion 11CSa of the small-diameter portion 11CS of the casing 11C is present at a position different from that of the opening portion 15Ca of the cap member 15C by 90 degrees in the rotational direction. Thus, the opening portion 11CSa of the small-diameter portion 11CS of the casing 11C is covered by the cap member 15C, and the insertion port of the USB connector 17 is not exposed to the outside. At this time, as depicted in FIG. 8A, the protruding portion 15Cb of the cap member 15C depresses the protrusion 18a of the switch member 18, so that the switch member 18 is in an opened state (switched-off state).

Hence, as depicted in FIG. 3A, electric connection between the USB connector 17 and the rechargeable battery 12 is interrupted by the switch member 18. Thus, even when water enters the insertion port of the USB connector 17 through a clearance between the cap member 15C and the small-diameter portion 11CS of the casing 11C, and a short circuit occurs between the connecting contacts of the USB connector 17, a current from the rechargeable battery 12 does not flow through the USB connector 17. It is therefore possible to prevent the occurrence of an unexpected situation such as destruction of an internal circuit or the like.

The first state is obtained when the opening portion 15Ca of the cap member 15C and the opening portion 11CSa of the small-diameter portion 11CS of the casing 11C are made to coincide with each other as depicted in FIG. 8B by rotating the cap member 15C by 90 degrees from the state of FIG. 8A. That is, the insertion port of the USB connector 17 is exposed to the outside through the opening portion 11CSa of the small-diameter portion 11CS and the opening portion 15Ca of the cap member 15C. At this time, the protruding portion 15Cb of the cap member 15C is rotated and moved by 90 degrees within an opening portion 11CSb of the small-diameter portion 11CS, resulting in a state of not depressing the protruding portion 19b of the switch member 18, as depicted in FIG. 8B. The switch member 18 is therefore set in a closed state (switched-on state).

Hence, as depicted in FIG. 3B, electric connection is established between the USB connector 17 and the rechargeable battery 12 through the switch member 18. When the connector jack at the end portion of the USB cable is inserted into the insertion port of the USB connector 17, a charging current flows through the USB connector 17 to the rechargeable battery 12, so that the charging of the rechargeable battery 12 is performed.

Incidentally, description has not been made of measure for defining rotational angle positions for setting the first state and rotational angle positions for setting the second state in the electronic pen 1C according to the foregoing fourth embodiment. However, locking in each of the states can be achieved with a so-called click feeling by respectively providing the external surface of the small-diameter portion 11CS of the casing 11C and the inner wall surface of the cap member 15C with a protrusion and a recessed portion fitted to each other at the rotational angle positions for setting the first state and respectively providing the external surface of the small-diameter portion 11CS of the casing 11C and the inner wall surface of the cap member 15C with a protrusion and a recessed portion fitted to each other at the rotational angle positions for setting the second state.

In addition, in the foregoing fourth embodiment, the opening portion 15Ca of the cap member 15C as a control member and the opening portion 11CSa of the small-diameter portion 11CS of the casing 11C are located at rotational angle positions different from each other by 90 degrees in the rotational direction in the first state of the electronic pen 1C. However, it is not essential that the rotational angle positions be different from each other by 90 degrees, and the rotational angle positions may be different from each other by any degrees as long as the rotational angle positions are angle positions where a separation angle between the opening portion 15Ca and the protruding portion 15Cb or the like is taken into consideration.

In addition, in the foregoing fourth embodiment, a rotational angle for switching between the first state and the second state by the cap member 15C as a control member is 90 degrees. However, it is needless to say that the rotational angle is not limited to 90 degrees.

Fifth Embodiment

Figure 9:
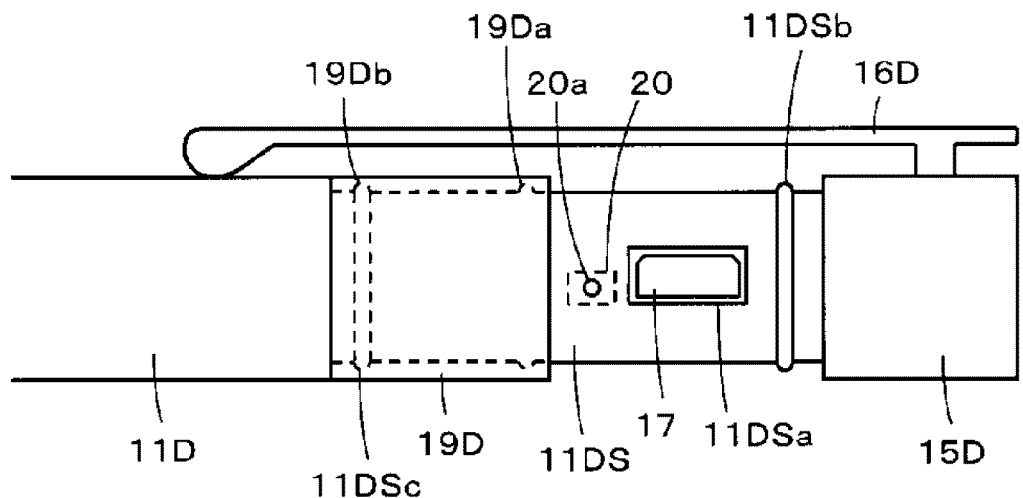
FIG. 9 is a diagram of assistance in explaining an example of a configuration of parts of a fifth embodiment of the rechargeable electronic pen according to the present disclosure.

FIG. 9 is a diagram of assistance in explaining parts of an electronic pen 1D according to a fifth embodiment. FIG. 9 is a side view of the rear end side of the electronic pen 1D according to the present fifth embodiment, and is a diagram of the first state. A control member in the electronic pen 1D according to the present fifth embodiment is a ring member 19D similar to that of the electronic pen 1C according to the third embodiment. However, in the fifth embodiment, the ring member 19D produces the first state and the second state by displacement resulting from sliding movement rather than rotation.

In addition, the present fifth embodiment does not use a switch member directly controlled to be opened and closed by the control member but uses a semiconductor switch as a switch member. Further, the control member is provided with a detector for detecting displacement between the first state and the second state, and the semiconductor switch is controlled according to a detection result of the detector. Used as the detector in an example to be described in the following is a light receiving sensor that distinguishes and detects the first state and the second state according to whether external light is received or not received.

As with the casing 11 of the electronic pen 1 according to the first embodiment, a casing 11D of the electronic pen 1D according to the present fifth embodiment has a small-diameter portion 11DS on a rear end side in an axial direction. In the electronic pen 1D according to the present fifth embodiment, as with the electronic pen 1B according to the third embodiment, a cap member 15D and a ring member 19D are provided as members fitted onto the small-diameter portion 11DS of the casing 11D.

However, in the electronic pen 1D according to the present fifth embodiment, the length in the axial direction of the ring member 19D is, in the present example, ½ of the length in the axial direction of the small-diameter portion 11DS exposed to the outside when only the cap member 15D is fitted to the small-diameter portion 11DS of the casing 11D.

In the electronic pen 1D according to the present fifth embodiment, a USB connector 17 is provided in a state of being disposed on a printed circuit board, not depicted, within the small-diameter portion 11DS of the casing 11D, and an opening portion 11DSa for exposing the insertion port of the USB connector 17 to the outside is formed in the small-diameter portion 11DS.

In addition, a light receiving sensor 20 as a detector is provided within the small-diameter portion 11DS of the casing 11D of the electronic pen 1D according to the present fifth embodiment, and a light receiving window 20a provided with a condensing lens for receiving external light is formed in the small-diameter portion 11DS. The length in the axial direction of the small-diameter portion 11DS is a length such that the insertion port of the USB connector 17 is exposed via the opening portion 11DSa and the light receiving window 20a of the light receiving sensor 20 is exposed to the outside in the first state as depicted in FIG. 9 and such that the ring member 19D can cover both the opening portion 11DSa and the light receiving window 20a when the second state is set by sliding movement of the ring member 19D.

In the present example, in order to lock the ring member 19D to the small-diameter portion 11DS of the casing 11D in the axial direction in the first state and the second state, a protruding portion 11DSb and a protruding portion 11DSc bulged in a ring shape are formed on the small-diameter portion 11DS of the casing 11D, and a recessed groove 19Da and a recessed groove 19Db in a ring shape are formed in the inner wall of the ring member 19D.

Figure 10:
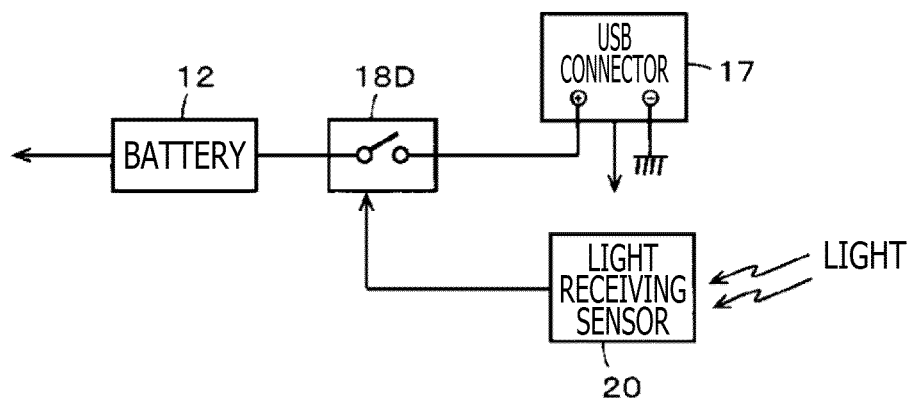
FIG. 10 is a diagram of assistance in explaining an example of an electric configuration in the fifth embodiment of the rechargeable electronic pen according to the present disclosure.

Parts of an internal electric configuration of the electronic pen 1D according to the present fifth embodiment are depicted in FIG. 10. Specifically, as depicted in FIG. 10, in the present fifth embodiment, a charging positive side terminal of the USB connector 17 is connected to a battery 12 via a switch circuit 18D formed by a transistor or a FET, for example. In the present example, the switch circuit 18D is controlled by detection output of the light receiving sensor 20. Other parts of the internal electric configuration of the electronic pen 1D according to the fifth embodiment are similar to those of the configuration depicted in FIGS. 3A and 3B, and are therefore omitted here.

Configured as described above, the electronic pen 1D according to the fifth embodiment is set in the second state when the ring-shaped protruding portion 11DSb of the small-diameter portion 11DS of the casing 11D is fitted into the recessed groove 19Da of the ring member 19D by sliding movement of the ring member 19D to the cap member 15D side in FIG. 9.

In the second state, the opening portion 11DSa of the small-diameter portion 11DS of the casing 11D is covered by the ring member 19D, so that the insertion port of the USB connector 17 is not exposed to the outside. In addition, the light receiving window 20a of the light receiving sensor 20 is covered by the ring member 19D, and is thus shielded from light. Then, the light receiving sensor 20 detects the light-shielded state, and the detection output of the light receiving sensor 20 turns off the switch circuit 18D.

Hence, electric connection between the USB connector 17 and the rechargeable battery 12 is interrupted by the switch circuit 18D. Thus, even when water enters the insertion port of the USB connector 17 through a clearance between the ring member 19D and the small-diameter portion 11DS of the casing 11D, and a short circuit occurs between the connecting contacts of the USB connector 17, a current from the rechargeable battery 12 does not flow through the USB connector 17. It is therefore possible to prevent the occurrence of an unexpected situation such as destruction of an internal circuit or the like.

In addition, the first state is set when the ring-shaped protruding portion 11DSc of the small-diameter portion 11DS of the casing 11D is fitted into the recessed groove 19Db of the ring member 19D as depicted in FIG. 9 by sliding movement of the ring member 19D to the pen tip side from the second state.

Then, the insertion port of the USB connector 17 is exposed to the outside through the opening portion 11DSa of the small-diameter portion 11DS. In addition, the light receiving window 20a is exposed to the outside. The light receiving sensor 20 therefore detects incident light through the light receiving window 20a. Thus, the switch circuit 18D is turned on according to a result of the detection.

Hence, electric connection is established between the USB connector 17 and the rechargeable battery 12 through the switch circuit 18D. When the connector jack at the end portion of the USB cable is inserted into the insertion port of the USB connector 17, a charging current flows through the USB connector 17 to the rechargeable battery 12, so that the charging of the rechargeable battery 12 is performed.

Incidentally, while the length in the axial direction of the ring member 19D is set at ½ of the length in the axial direction of the small-diameter portion 11DS of the casing 11D which small-diameter portion is exposed when the cap member 15D is fitted, the length in the axial direction of the ring member 19D may be longer than ½ of the length in the axial direction of the small-diameter portion 11DS, or may be shorter than ½ of the length in the axial direction of the small-diameter portion 11DS.

It is to be noted that the detector is not limited to the use of an optical sensor as in the foregoing example. For example, a magnetic detector for detecting the first state and the second state of the electronic pen may be formed by providing a magnetic sensor in place of the light receiving sensor and providing an element or a device generating a magnetic field on the control member side, the element or the device being a permanent magnet or the like, and detecting the magnetic field from the element or the device generating the magnetic field by the magnetic sensor.

The configuration that detects the first state and the second state of the electronic pen by using the semiconductor switch and the detector is applicable also to the foregoing first to fourth embodiments, and is applicable also to embodiments to be described later.

Sixth Embodiment

The foregoing embodiments represent a case where the insertion port of the USB connector 17 is exposed from the opening portion provided to the side circumferential surface of the casing of the electronic pen. However, the present disclosure is applicable also to a case where the insertion port of the USB connector 17 is exposed from an opening on the rear end side of the tubular casing of the electronic pen. A sixth embodiment to be described in the following is an example in that case.

FIGS. 11A, 11B, and 11C are diagrams of assistance in explaining parts of an electronic pen 1E according to the present sixth embodiment, and are diagrams of the rear end side of the electronic pen 1E.

FIG. 11A is a diagram of assistance in explaining the first state of the electronic pen 1E according to the present sixth embodiment. FIG. 11B is a diagram of a casing 11E as viewed from a rear end side in an axial direction in the first state of the electronic pen 1E according to the present sixth embodiment. In addition, FIG. 11C is a diagram of the electronic pen 1E according to the present sixth embodiment in the second state. Also in the electronic pen 1E according to the present sixth embodiment, parts similar to those of the electronic pen 1 according to the first embodiment are identified by the same reference numerals, and description thereof will be omitted.

As with the casing 11 of the electronic pen 1 according to the first embodiment, the casing 11E of the electronic pen 1E according to the present sixth embodiment has a small-diameter portion 11ES on the rear end side in the axial direction. In the electronic pen 1E according to the present sixth embodiment, as depicted in FIGS. 11A and 11C, a cap member 15E is provided as a member fitted to the small-diameter portion 11ES of the casing 11E. In this case, the cap member 15E is fitted to the small-diameter portion 11ES of the casing 11E of the electronic pen 1E so as to be slidingly movable in the axial direction. That is, the cap member 15E can be detached from the casing 11E.

As depicted in FIGS. 11A to 11C, as in the electronic pen 1 according to the first embodiment, a USB connector 17 and a switch member 18 arranged on a printed circuit board 13P are disposed within a hollow portion of the small-diameter portion 11ES of the casing 11E. However, in the electronic pen 1E according to the present sixth embodiment, as depicted in FIG. 11B, the USB connector 17 is disposed on the printed circuit board 13P such that the insertion port of the USB connector 17 can be exposed to the outside from an opening portion 11ESa on the rear end side in the axial direction of the small-diameter portion 11ES of the tubular casing 11E.

In addition, the switch member 18 is disposed on the printed circuit board 13P such that a protrusion 18a protrudes outward of the external surface of the small-diameter portion 11ES from an opening portion 11ESb provided on the small-diameter portion 11ES of the casing 11E.

On the other hand, the cap member 15E is configured to have a recessed hole 15Ea fitted onto the small-diameter portion 11S of the casing 11. A clip member 16E is attached to the cap member 15E in the present example.

In the present example, in order to lock the small-diameter portion 11ES of the casing 11E and the cap member 15E to each other in the axial direction in the second state, a protruding portion 11ESc bulged in a ring shape is formed on an end side of the small-diameter portion 11ES of the casing 11E, and a ring-shaped recessed groove 15Eb is formed within the recessed hole 15Ea of the cap member 15E.

An electric configuration in the electronic pen 1E according to the present sixth embodiment is also similar to that of the electronic pen 1 according to the first embodiment depicted in FIGS. 3A and 3B.

In the electronic pen 1E according to the sixth embodiment, which is configured as described above, when the cap member 15E is fitted onto the small-diameter portion 11ES of the casing 11E and pushed in, the ring-shaped protruding portion 11ESc of the small-diameter portion 11ES is fitted into the ring-shaped recessed groove 15Eb of the recessed hole 15Ea of the cap member 15E. The cap member 15E is thus locked to the casing 11E.

In this state, the opening portion 11ESa of the small-diameter portion 11ES of the casing 11E is covered by the cap member 15E, and therefore the insertion port of the USB connector 17 is not exposed to the outside. In addition, the protrusion 18a of the switch member 18 is set in a state of being pushed in to the casing side by the cap member 15E, so that the switch member 18 is in an opened state (switched-off state), as depicted in FIG. 3A. That is, the electronic pen 1E is in the second state, and the switch member 18 is in the opened state in the electric configuration.

Hence, as depicted in FIG. 3A, electric connection between the USB connector 17 and the rechargeable battery 12 is interrupted by the switch member 18. Thus, even when water enters the insertion port of the USB connector 17 through a clearance between the cap member 15E and the small-diameter portion 11ES of the casing 11E, and a short circuit occurs between the connecting contacts of the USB connector 17, a current from the rechargeable battery 12 does not flow through the USB connector 17. It is therefore possible to prevent the occurrence of an unexpected situation such as destruction of an internal circuit or the like.

Next, the cap member 15E is slidingly moved to an opposite side from the pen tip side of the core body 14 in the axial direction from the second state depicted in FIG. 11C, and the cap member 15E is detached from the small-diameter portion 11ES of the casing 11E, as depicted in FIG. 11A.

In this state, as depicted in FIG. 11A, the opening portion 11ESa in the axial direction of the small-diameter portion 11ES of the casing 11E is exposed without being covered by the cap member 15E. Therefore, the insertion port in which the connecting contacts of the USB connector 17 are formed is exposed to the outside via the opening portion 11ESa in the axial direction of the small-diameter portion 11ES of the casing 11E, as depicted in FIG. 11B.

In addition, because the pressing of the protrusion 18a of the switch member 18 by the cap member 15E ceases, the protrusion 18a protrudes to the outside as depicted in FIG. 11A, so that the switch member 18 is in a closed state (switched-on state). The electronic pen 1E is thus in the first state.

Hence, as depicted in FIG. 3B, electric connection is established between the USB connector 17 and the rechargeable battery 12 through the switch member 18. When the connector jack at the end portion of the USB cable is inserted into the insertion port of the USB connector 17, a charging current flows through the USB connector 17 to the rechargeable battery 12, so that the charging of the rechargeable battery 12 is performed.

Seventh Embodiment

As in the electronic pen 1E according to the sixth embodiment, a seventh embodiment is another example in the case where the insertion port of the USB connector 17 is exposed from an opening on the rear end side of the tubular casing of the electronic pen. In the electronic pen 1E according to the sixth embodiment, a cap member is used as a control member, and the first state and the second state are produced by slidingly moving the cap member in the axial direction of the casing. In the present seventh embodiment, the control member is a cap member, but the first state and the second state are produced by rotating the cap member.

Figure 12A:
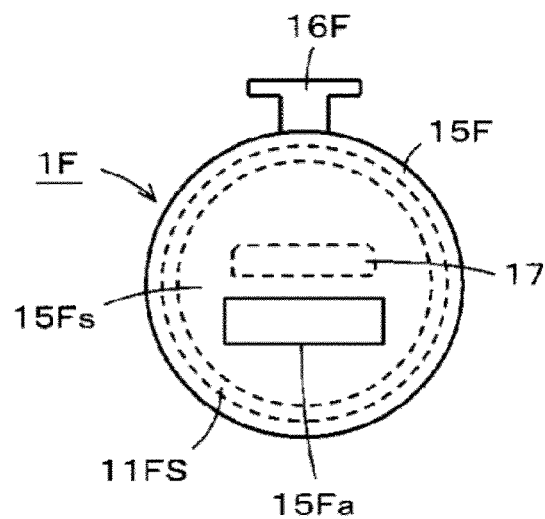
FIGS. 12A and 12B are diagrams of assistance in explaining an example of a configuration of parts of a seventh embodiment of the rechargeable electronic pen according to the present disclosure.
Figure 12B:
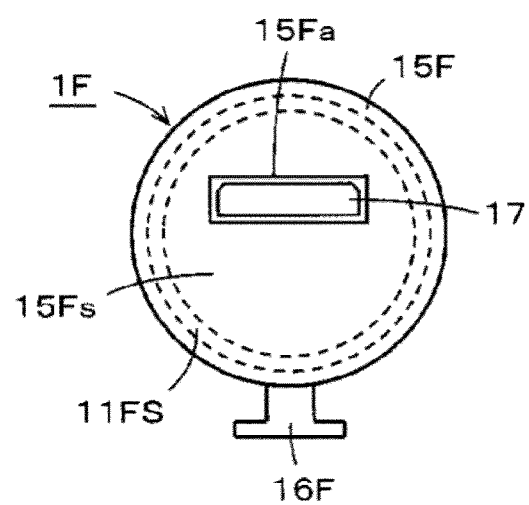

FIGS. 12A and 12B are diagrams of assistance in explaining an electronic pen 1F according to the present seventh embodiment, and are diagrams of the electronic pen 1F as viewed from a rear end side in an axial direction. In the electronic pen 1F according to the present seventh embodiment, a cap member 15F is rotatably fitted onto a small-diameter portion 11FS of a tubular casing.

Within a hollow portion of the small-diameter portion 11FS of the tubular casing, as in the electronic pen 1E according to the sixth embodiment, the USB connector 17 is disposed on a printed circuit board (not depicted) such that the insertion port of the USB connector 17 can be exposed to the outside from an opening portion 11FSa on the rear end side in the axial direction of the small-diameter portion 11FS of the tubular casing, as depicted in FIGS. 12A and 12B.

As depicted in FIG. 12B, an opening portion 15Fa for exposing the insertion port of the USB connector 17 to the outside is formed in an end surface 15Fs of the cap member 15F which end surface is orthogonal to the axial direction. In this case, in the electronic pen 1F according to the present seventh embodiment, the position of the insertion port of the USB connector 17 is a position offset from the center position of the opening portion 11FSa on the rear end side in the axial direction of the small-diameter portion 11FS of the tubular casing. When the cap member 15F is rotated by 180 degrees from the state of FIG. 12B, the end surface 15Fs orthogonal to the axial direction of the cap member 15F covers the insertion port of the USB connector 17 without the opening portion 15Fa coinciding with the position of the insertion port of the USB connector 17, as depicted in FIG. 12A.

That is, in the electronic pen 1F according to the present seventh embodiment, the first state is a state in which a rotational direction position of the cap member 15F makes the insertion port of the USB connector 17 exposed to the outside through the opening portion 15Fa as depicted in FIG. 12B, and the second state is set at a rotational direction position depicted in FIG. 12A which rotational direction position is obtained by rotation by 180 degrees from the state of FIG. 12B. A rechargeable state and a non-rechargeable state are set in the first state and the second state, respectively, as in the foregoing embodiments.

Incidentally, though not depicted in FIGS. 12A and 12B, a switch member 18 configured to be set in a closed state in the first state and set in an opened state in the second state by the rotation of the cap member 15F is provided on the printed circuit board as in the foregoing embodiments.

Incidentally, though not depicted in the example of FIGS. 12A and 12B, protruding portions may be provided to one of the inner wall surface of the cap member 15F and the outer circumferential side surface of the small-diameter portion 11FS of the casing, and recessed portions may be provided to the other in order that the cap member 15F can be locked to the small-diameter portion 11FS of the casing at the position of the first state and the position of the second state.

Eighth Embodiment

An eighth embodiment is an example in which an opening portion for exposing the insertion port of the USB connector 17 is provided to the side circumferential surface of the casing of an electronic pen, and the first state and the second state described above are produced in the electronic pen by rotating a control member as in the fourth embodiment.

Figure 13A:
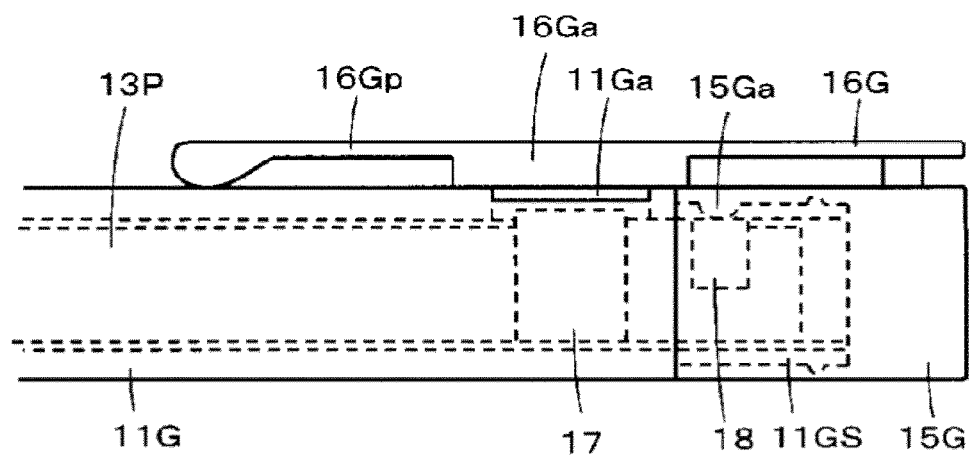
FIGS. 13A and 13B are diagrams of assistance in explaining an example of a configuration of parts of an eighth embodiment of the rechargeable electronic pen according to the present disclosure.
Figure 13B:
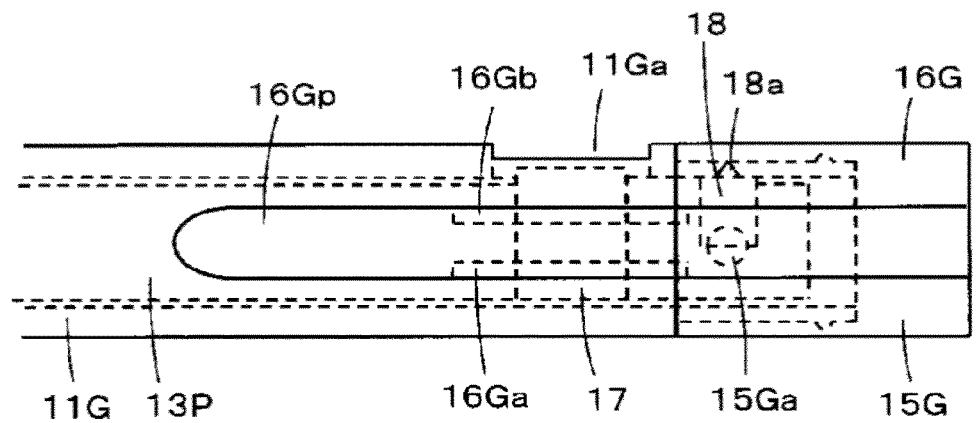

FIGS. 13A and 13B are diagrams of assistance in explaining parts of an electronic pen 1G according to the present eighth embodiment. FIG. 13A is a diagram of the electronic pen 1G according to the present eighth embodiment in the second state. FIG. 13B is a diagram of the electronic pen 1G according to the present eighth embodiment in the first state.

In the present eighth embodiment, as in the fourth embodiment, a cap member 15G to which a clip member 16G is fixed is used as a control member. In the present eighth embodiment, as depicted in FIGS. 13A and 13B, the cap member 15G is rotatably fitted to a small-diameter portion 11GS on the rear end side of a casing 11G of the electronic pen 1G.

In the fourth embodiment, the opening portion 15Ca for exposing the insertion port of the USB connector 17 is provided to the cap member 15C, the opening portion 15Ca is configured to be rotated together with the cap member 15C, and the insertion port of the USB connector 17 is covered by the cap member 15C in the second state.

On the other hand, in the present eighth embodiment, the cap member 15G is not provided with an opening portion, but the peripheral side surface of the casing 11G is provided with an opening portion 11Ga for exposing the insertion port of the USB connector 17. The opening portion 11Ga is disposed at an axial direction position such that when the cap member 15G is fitted to the casing 11G, the opening portion 11Ga can be hidden by the clip member 16G fixed to the cap member 15G rotatable with respect to the casing 11G, as depicted in FIGS. 13A and 13B. The USB connector 17 is disposed on a printed circuit board 13P such that the insertion port of the USB connector 17 is exposed from the opening portion 11Ga.

Hence, the insertion port of the USB connector 17 is exposed to the outside via the opening portion 11Ga at all times. However, in the electronic pen 1G according to the present eighth embodiment, in the position of the second state depicted in FIG. 13A, the clip member 16G is positioned at a rotational angle position located directly above the opening portion 11Ga of the casing 11G, and the insertion port of the USB connector 17 visually appears not to be exposed through the opening portion 11Ga.

Further, as depicted in FIGS. 13A and 13B, the clip member 16G of the electronic pen 1G according to the present eighth embodiment includes: a plate-shaped clip piece 16Gp that is elastically displaceable and has the axial direction of the electronic pen 1G as a longitudinal direction thereof; and two wall portions 16Ga and 16Gb that extend from both sides in the width direction of the clip piece 16Gp to the casing 11G side of the electronic pen 1G in a direction orthogonal to the plate-shaped flat surface of the clip piece 16Gp. In the present example, the two wall portions 16Ga and 16Gb of the clip member 16G are formed in positions on the clip piece 16Gp such that the clip member 16G does not expose the opening portion 11Ga of the casing 11G to the outside. That is, in the electronic pen 1G according to the present eighth embodiment, at a time of the second state of FIG. 13A, the opening portion 11Ga of the casing 11G is located between the two wall portions 16Ga and 16Gb of the clip member 16G, and is thus not seen from the outside.

Hence, at the time of the second state, the insertion port of the USB connector 17 is apparently not exposed from the opening portion 11Ga due to the clip member 16G, and the presence of the clip member 16G obstructs the insertion of the connector jack of the USB cable into the insertion port of the USB connector 17.

In the present eighth embodiment, as depicted in FIGS. 13A and 13B, a switch member 18 is disposed on the printed circuit board 13P within a hollow portion of the small-diameter portion 11GS of the casing 11G. A protruding portion 15Ga for depressing a protrusion 18a of the switch member 18 and thus setting the switch member 18 in an opened state (switched-off state) in the second state depicted in FIG. 13A is formed on the inner circumferential wall surface of the cap member 15G. Hence, in the second state, as described above, electric connection between the USB connector 17 and the rechargeable battery 12 is interrupted by the switch member 18.

The first state is set, as depicted in FIG. 13B, when the cap member 15G is rotated by 90 degrees from the second state of FIG. 13A. In the first state, the clip member 16G rotates with the rotation of the cap member 15G. Therefore, a space above the opening portion 11Ga of the casing 11G is opened, so that the connector jack of the USB cable can be inserted into the insertion port of the USB connector 17. In addition, in the first state, the protruding portion 15Ga provided to the inner circumferential wall surface of the cap member 15G also rotates together. Therefore, the protrusion 18a of the switch member 18 protrudes after being released from the state of being depressed by the protruding portion 15Ga, so that the switch member 18 is in a closed state (switched-on state).

Hence, in the first state, as described above, electric connection is established between the USB connector 17 and the rechargeable battery through the switch member 18. The charging of the rechargeable battery 12 is performed by inserting the connector jack of the USB cable into the insertion port of the USB connector 17.

Incidentally, while the wall portions 16Ga and 16Gb of the clip member 16G are formed on a part in the longitudinal direction of the clip piece 16Gp, the wall portions 16Ga and 16Gb of the clip member 16G may be formed over the whole in the longitudinal direction of the clip piece 16Gp.

Other Embodiments or Modifications

The above description has been made of a case where the electronic pen according to the present disclosure is applied to active capacitive type electronic pens. However, a system of coupling between the electronic pen according to the present disclosure and the sensor may be any system, and the electronic pen according to the present disclosure is of course applicable also to electromagnetic induction type electronic pens.

In addition, while the charging connection terminal member in the foregoing examples is a Type C USB connector, the charging connection terminal member may of course be another type of USB connector. In addition, the charging connection terminal member is not limited to USB connectors, but may be other general-purpose charging connectors or dedicated charging connectors.

What is claimed is:

1. A rechargeable electronic pen comprising:
a casing;
a storage element disposed within the casing;
a charging connection terminal disposed within the casing so as to expose a charging contact to an outside of the electronic pen via an opening of the casing;
a switch disposed between the storage element and the charging connection terminal; and
a control member configured to perform opening and closing of the switch by being displaced with respect to the casing,
wherein the control member is displaceable with respect to the casing between a first state in which the charging contact of the charging connection terminal is exposed to the outside of the electronic pen via the opening and a second state in which the charging contact of the charging connection terminal is not exposed to the outside of the electronic pen,
wherein, when the control member is in the first state, the switch electrically connects the storage element to the charging contact of the charging connection terminal, and wherein, when the control member is in the second state, the switch electrically disconnects the storage element from the charging contact of the charging connection terminal.

2. The rechargeable electronic pen according to claim 1, wherein
the control member covers the opening portion in the second state, and exposes the charging contact portion to the outside of the electronic pen via the opening of the casing in the first state.

3. The rechargeable electronic pen according to claim 1, wherein
the control member is displaced between the first state and the second state by being displaced in an axial direction of the casing.

4. The rechargeable electronic pen according to claim 1, wherein
the control member is displaced between the first state and the second state by being displaced with respect to the casing in a direction of rotation about an axis that extends in an axial direction of the casing.

5. The rechargeable electronic pen according to claim 1, wherein
the control member is displaced between the first state and the second state by being displaced in an axial direction of the casing and being displaced with respect to the casing in a direction of rotation about an axis that extends in the axial direction of the casing.

6. The rechargeable electronic pen according to claim 1, wherein
the control member includes a clip provided on the casing.

7. The rechargeable electronic pen according to claim 1, wherein
the control member includes a cap fitted to an end of the casing that is on a side of the casing that is opposite to a pen tip side of the casing.

8. The rechargeable electronic pen according to claim 7, wherein
the cap includes a clip.

9. The rechargeable electronic pen according to claim 1, wherein
the control member includes a ring-shaped member disposed between the casing and a cap fitted to an end of the casing that is on a side of the casing that is opposite to a pen tip side of the casing.

10. The rechargeable electronic pen according to claim 1, wherein
the opening is formed in a side surface along an axial direction of the casing.

11. The rechargeable electronic pen according to claim 1, wherein
the opening is formed on an end of the casing that is on a side of the casing that is opposite to a pen tip side of the casing, the opening facing in an axial direction of the casing.

12. The rechargeable electronic pen according to claim 1, wherein
the switch has a protrusion that is elastically displaced and is set in an opened state and a closed state according to displacement of the protrusion, and the protrusion is displaced by displacement of the control member with respect to the casing.

13. The rechargeable electronic pen according to claim 1, wherein
the charging contact of the charging connection terminal has at least a positive side contact terminal and a negative side contact terminal.

14. The rechargeable electronic pen according to claim 1, wherein
the charging connection terminal is a universal serial bus connector.

15. The rechargeable electronic pen according to claim 14, wherein
the charging connection terminal is a connector of a universal serial bus Type-C standard, and
the opening is disposed within the casing such that an axial direction of the casing is a longitudinal direction of the opening.

16. The rechargeable electronic pen according to claim 1, further comprising:
a conductive core body protruding from an opening on a pen tip side of the casing, wherein
the rechargeable electronic pen sends out a signal through the core body by a capacitive coupling system.

17. The rechargeable electronic pen according to claim 1, wherein
the rechargeable electronic pen sends out a signal by an electromagnetic induction system.

18. The rechargeable electronic pen according to claim 1, wherein
the switch is a semiconductor switch and includes a detector which, in operation, detects displacement of the control member, and the semiconductor switch is controlled according to a detection result of the detector.

19. The rechargeable electronic pen according to claim 18, wherein
the control member covers the opening portion in the second state, and exposes the charging contact portion to the outside via the opening portion of the casing in the first state, and
the detector includes an optical sensor which, in operation, detects the displacement of the control member.

20. The rechargeable electronic pen according to claim 18, wherein
the detector includes an magnetic sensor which, in operation, detects the displacement of the control member.

* * * * *